(12) United States Patent
Narendra et al.

(10) Patent No.: US 9,230,282 B2
(45) Date of Patent: *Jan. 5, 2016

(54) REMOTE DEPOSIT CAPTURE SYSTEM WITH CHECK IMAGE GENERATION AND STORAGE

(71) Applicant: Tyfone, Inc., Portland, OR (US)

(72) Inventors: Siva G. Narendra, Portland, OR (US); Donald Allen Bloodworth, Camas, WA (US); Dana B. LeMoine, San Diego, CA (US); Prabhakar Tadepalli, Bangalore (IN)

(73) Assignee: Tyfone, Inc., Portland, OR (US)

( * ) Notice: Subject to any disclaimer, the term of this patent is extended or adjusted under 35 U.S.C. 154(b) by 128 days.

This patent is subject to a terminal disclaimer.

(21) Appl. No.: 13/802,516

(22) Filed: Mar. 13, 2013

(65) Prior Publication Data

US 2014/0270463 A1 Sep. 18, 2014

(51) Int. Cl.
| | | |
|---|---|---|
| *G06Q 20/32* | (2012.01) | |
| *H04W 12/06* | (2009.01) | |
| *G06Q 20/10* | (2012.01) | |
| *G06Q 20/04* | (2012.01) | |
| *G06Q 40/02* | (2012.01) | |
| *G06Q 20/08* | (2012.01) | |
| *G06Q 20/20* | (2012.01) | |
| *G06Q 40/00* | (2012.01) | |

(52) U.S. Cl.
CPC ............... *G06Q 40/02* (2013.01); *G06Q 20/08* (2013.01); *G06Q 20/20* (2013.01); *G06Q 20/322* (2013.01); *G06Q 20/3223* (2013.01); *G06Q 40/128* (2013.12); *H04W 12/06* (2013.01); *G06Q 20/042* (2013.01); *G06Q 20/108* (2013.01)

(58) Field of Classification Search
None
See application file for complete search history.

(56) References Cited

U.S. PATENT DOCUMENTS

| | | | |
|---|---|---|---|
| 6,032,137 A | 2/2000 | Ballard | |
| 7,647,275 B2 | 1/2010 | Jones | |
| 7,778,457 B2 | 8/2010 | Nepomniachtchi et al. | |
| 7,876,949 B1 | 1/2011 | Oakes, III et al. | |
| 7,949,176 B2 | 5/2011 | Nepomniachtchi | |
| 7,953,268 B2 | 5/2011 | Nepomniachtchi | |
| 7,978,900 B2 | 7/2011 | Nepomniachtchi et al. | |
| 8,000,514 B2 | 8/2011 | Nepomniachtchi et al. | |
| 8,290,237 B1 * | 10/2012 | Burks et al. ................... | 382/137 |
| 8,315,945 B1 | 11/2012 | Gupta | |
| 8,332,329 B1 * | 12/2012 | Thiele .............................. | 705/64 |
| 8,489,504 B1 | 7/2013 | Gupta | |
| 2002/0154127 A1 | 10/2002 | Vienneau et al. | |
| 2005/0021466 A1 | 1/2005 | Buchanan et al. | |
| 2007/0022053 A1 * | 1/2007 | Waserstein et al. ............. | 705/42 |
| 2008/0010204 A1 | 1/2008 | III et al. | |
| 2008/0208727 A1 | 8/2008 | Mclaughlin et al. | |
| 2008/0304769 A1 | 12/2008 | Hollander et al. | |

(Continued)

OTHER PUBLICATIONS

U.S. Appl. No. 13/802,523 Office Action Aug. 5, 2014, 17 pages.
U.S. Appl. No. 13/802,498 Office Action dated Oct. 7, 2014, 11 pages.
US Patent Office Action Jan. 17, 2014, 9 pages.

(Continued)

*Primary Examiner* — Utpal Shah
(74) *Attorney, Agent, or Firm* — Dana B. LeMoine

(57) ABSTRACT

A check image generator application generates a remote deposit capture RDC compatible check image. The RDC compatible check image is sent from a sender mobile device to a recipient mobile device. The RDC compatible check image may pass through a server and may be encrypted. The recipient mobile device receives the RDC compatible check image and forwards it to a financial institution for deposit.

20 Claims, 27 Drawing Sheets

(56) References Cited

U.S. PATENT DOCUMENTS

| | | |
|---|---|---|
| 2009/0094148 A1* | 4/2009 | Gilder et al. ............... 705/35 |
| 2009/0240620 A1 | 9/2009 | Kendrick et al. |
| 2009/0327129 A1 | 12/2009 | Collas et al. |
| 2010/0078471 A1 | 4/2010 | Lin et al. |
| 2010/0198733 A1* | 8/2010 | Gantman et al. ............ 705/75 |
| 2011/0106675 A1 | 5/2011 | Perlman |
| 2011/0170740 A1 | 7/2011 | Coleman |
| 2011/0194750 A1 | 8/2011 | Nepomniachtchi |
| 2011/0218880 A1 | 9/2011 | Hammad et al. |
| 2012/0030105 A1 | 2/2012 | Jones et al. |
| 2012/0113489 A1 | 5/2012 | Heit et al. |
| 2012/0158581 A1 | 6/2012 | Cooley et al. |
| 2012/0226609 A1 | 9/2012 | Ebbert et al. |
| 2012/0287073 A1 | 11/2012 | Melnyk et al. |
| 2013/0054461 A1 | 2/2013 | Gupta et al. |
| 2013/0097075 A1 | 4/2013 | Love |
| 2013/0097076 A1* | 4/2013 | Love ........................... 705/42 |
| 2013/0198071 A1 | 8/2013 | Jurss |
| 2014/0052621 A1 | 2/2014 | Love |

OTHER PUBLICATIONS

PCT/US2014/02314 International Search Report and Written Opinion, dated Jun. 25, 2014, 10 pages.

U.S. Appl. 13/802,492 Office Action Jun. 2, 2014, 20 pages.

U.S. Appl. No. 13/802,481 Office Action dated Dec. 1, 2014, 13 pages.

U.S. Appl. No. 13/802,492 Office Action dated Jan. 30, 2015, 20 pages.

U.S. Appl. No. 13/802,498 Office Action dated Apr. 1, 2015, 11 pages.

U.S. Appl. No. 13/802,510 Office Action dated Nov. 6, 2014, 12 pages.

U.S. Appl. No. 13/802,523 Office Action dated Jan. 16, 2015, 19 pages.

U.S. Appl. No. 13/802,481 Office Action dated May 28, 2015, 12 pages.

U.S. Appl. No. 13/802,498 Office Action dated Aug. 19, 2015, 12 pages.

U.S. Appl. No. 13/802,510 Office Action dated Jul. 22, 2015, 11 pages.

* cited by examiner

| CHECK IMAGE GENERATOR | | | |
|---|---|---|---|
| HISTORY | | | |
| Rcpt | Date | Code | Amt |
| Julie | 3/1/13 | 3456 | $50 |
| ⋮ | ⋮ | ⋮ | ⋮ |

REMOTE DEPOSIT CAPTURE SYSTEM WITH CHECK IMAGE GENERATION AND STORAGE

FIELD

The present invention relates to remote deposit of financial instruments, and more specifically to remote deposit using mobile devices.

BACKGROUND

"Remote deposit" refers to the ability to deposit a check into a bank account from a remote location, such as an office or home, without having to physically deliver a paper check to the bank. This is typically accomplished by capturing a digital image of the front and back of the paper check into a computer, then transmitting that image to the bank, a practice that became legal in the United States in 2004 when the Check Clearing for the 21st Century Act ("Check 21 Act") took effect. The image that is transmitted to the bank is referred to as a "substitute check." "Remote deposit capture" refers to the process of capturing an image of a paper check to create a substitute check. Remote deposit capture (RDC) is typically performed using a scanner such as a transport scanner, a flat-bed scanner, or a specialized check-scanner; or using a camera, such as those commonly found in smartphones. The terms "remote deposit" and "remote deposit capture" are often used interchangeably to describe remote deposit services offered by financial institutions.

In typical remote deposit scenarios, a payee receives a paper check from a payor, and then performs remote deposit capture to create a substitute check. The payee then transmits the substitute check to the bank for deposit. Smartphone applications have recently emerged that capture check images using smartphone cameras to support remote deposit of paper checks. See, e.g., U.S. Pat. No. 7,778,457.

BRIEF DESCRIPTION OF THE DRAWINGS

FIG. 30 shows a mobile device screen shot of a check image generator application in accordance with various embodiments of the present invention;

DESCRIPTION OF EMBODIMENTS

Figure 1:
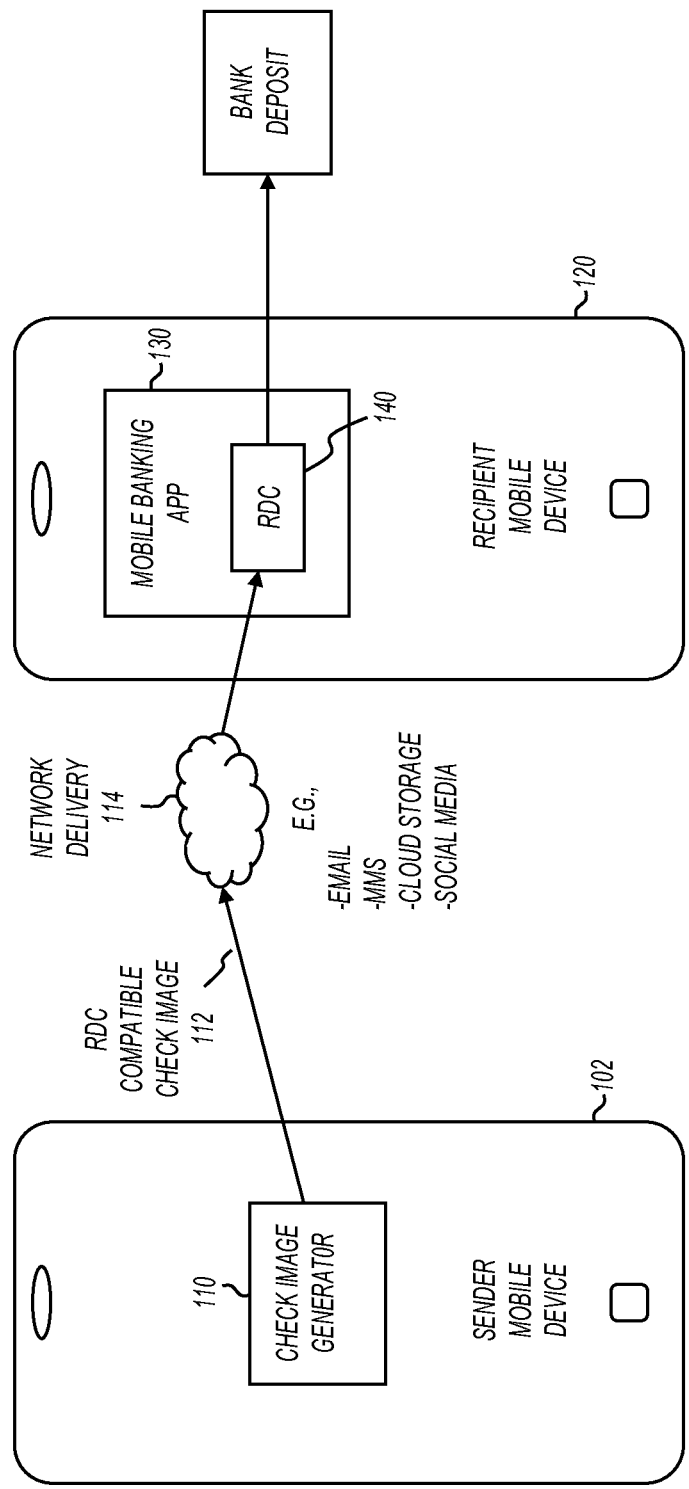
FIGS. 1 and 2 show diagrams of mobile remote deposit systems in accordance with various embodiments of the present invention.

In the following detailed description, reference is made to the accompanying drawings that show, by way of illustration, various embodiments of an invention. These embodiments are described in sufficient detail to enable those skilled in the art to practice the invention. It is to be understood that the various embodiments of the invention, although different, are not necessarily mutually exclusive. For example, a particular feature, structure, or characteristic described in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a diagram of a mobile remote deposit system in accordance with various embodiments of the present invention. System 100 includes sender mobile device 102 and recipient mobile device 120. In some embodiments, sender mobile device 102 is a mobile phone such as a smartphone. In other embodiments, sender mobile device 102 is a tablet computer. In still further embodiments, sender mobile device 102 is a laptop or netbook computer. Recipient mobile device 120 may similarly be any type of mobile device, including, but not limited to, a smartphone, a tablet computer, or a laptop computer.

Sender mobile device 102 includes a check image generator application 110, and recipient mobile device 120 includes a remote deposit capture (RDC) application 140. In some embodiments, RDC application 140 is within a mobile banking application 130, but this is not necessary. Some embodiments include a standalone RDC application.

In operation, check image generator application 110 generates an RDC compatible check image 112. The RDC compatible check image is delivered from sender mobile device 102 to recipient mobile device 120 using network delivery mechanism 114. RDC application 140 receives the RDC compatible check image and forwards it to a bank for deposit.

As used herein, the term "RDC compatible check image" refers to a substitute check that complies with any remote deposit requirements imposed by RDC application 140 or the bank. For example, in some embodiments, RDC application 140 or the bank may require that the image be bi-tonal with a color depth of one bit per pixel. Other example requirements may include image size, minimum or maximum resolution, orientation, aspect ratio, or the like.

As described further below, check image generator application 110 may generate RDC compatible check image 112 in many different ways. For example, in some embodiments, check image generator application 110 may prompt a user of sender mobile device 102 to enter check information. In other embodiments, check image generator application 110 may capture an image of a check, perform optical character recognition, and combine the result with a "perfect" image of a check.

Network delivery mechanism 114 may include any mechanism capable of delivering RDC compatible check image 112 from sender mobile device 102 to recipient mobile device 120. For example, sender mobile device 102 may send RDC compatible check image 112 in an email message or a multimedia message (MMS). Further, sender mobile device 102 may store RDC compatible check image 112 in the cloud or on a social media site for retrieval by recipient mobile device 120.

RDC application 140 receives RDC compatible check image 112 from network delivery mechanism 114 and forwards the image for deposit. Because the received check image 112 complies with RDC requirements, the check image 112 can be forwarded to the bank without any further image processing. In some embodiments, RDC application 140 also includes the ability to capture and process a check image, but this is not essential.

In some embodiments, sender mobile device 102 is in the possession of, and is by operated by, a payor that wishes to send a check to a payee. The payor interacts with sender mobile device 102 to generate RDC compatible check image 112. Similarly, in these embodiments, recipient mobile device 120 is in the possession of, and is operated by, a payee that is to receive the check written by the payor. Generation and transmission of an RDC compatible check image by the payor eliminates the need for a physical check to be transferred between the parties. Reception of the RDC compatible check image by the payee eliminates the need for the payee to capture the check image.

Figure 2:
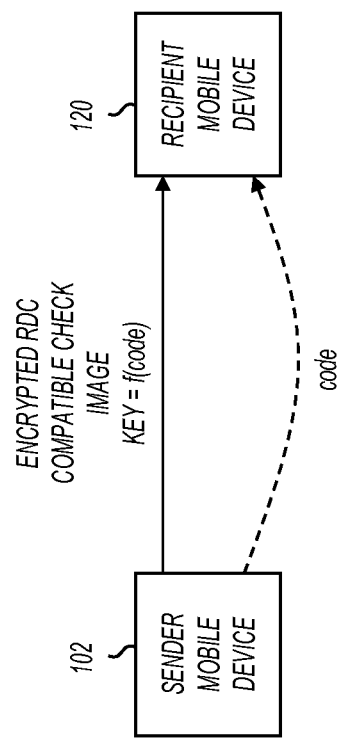

FIG. 2 shows a diagram of a mobile remote deposit system in accordance with various embodiments of the present invention. System 200 includes sender mobile device 102 and recipient mobile device 120. In operation, sender mobile device 102 encrypts the RDC compatible check image prior to sending it to recipient mobile device 120. The encryption is performed using an encryption key that is a function of a code. The code is sent separately from sender mobile device 102 to recipient mobile device 120.

In some embodiments, the code used to generate the key is selected by the user of sender mobile device 102. In other embodiments, the code is auto-generated by the check image generator application 110. Further, in some embodiments, the code is used as the encryption key directly.

Figure 3:
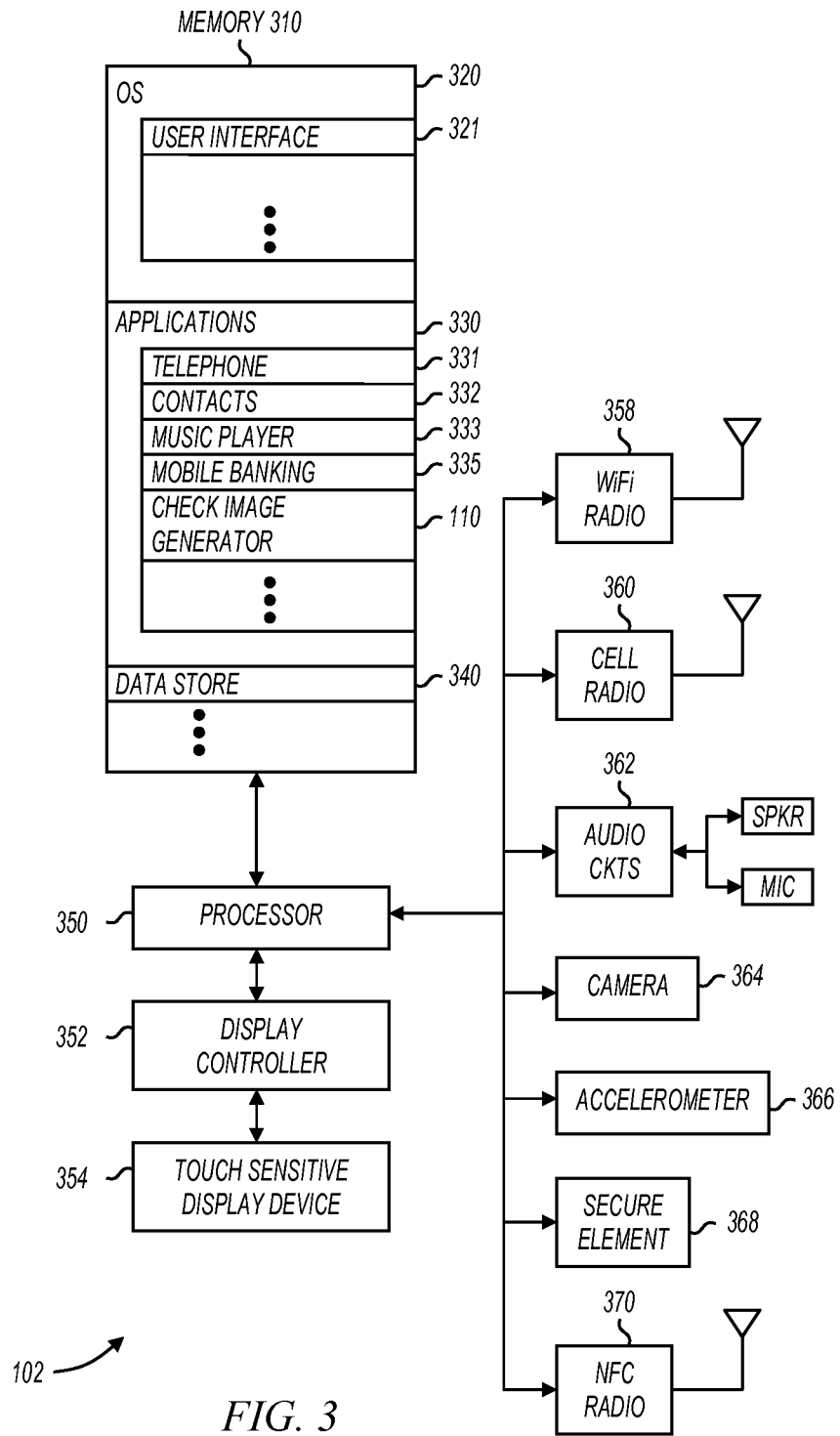
FIG. 3 shows a block diagram of a mobile device in accordance with various embodiments of the invention.

FIG. 3 shows a block diagram of a mobile device in accordance with various embodiments of the invention. The mobile device shown in FIG. 3 represents a sender mobile device such as sender mobile device 102 (FIG. 1) with a check image generator 110 application installed. Mobile device 102 includes processor 350, memory 310, display controller 352, touch sensitive display device 354, WiFi radio 358, cellular radio 360, audio circuits 362, camera 364, accelerometer 366, secure element 368, and near field communications (NFC) radio 370. Mobile device 102 may be any type of mobile device that includes the components shown. For example, in some embodiments, mobile device 102 may be a cell phone, a smartphone, a tablet computer, a laptop computer, or the like.

Processor 350 may be any type of processor capable of executing instructions stored in memory 310 and capable of interfacing with the various components shown in FIG. 3. For example, processor 350 may be a microprocessor, a digital signal processor, an application specific processor, or the like. In some embodiments, processor 350 is a component within a larger integrated circuit such as a system on chip (SOC) application specific integrated circuit (ASIC).

Display controller 352 provides an interface between processor 350 and touch sensitive display device 354. In some embodiments, display controller 352 is integrated within processor 350, and in other embodiments, display controller 352 is integrated within touch sensitive display device 354.

Touch sensitive display device 354 is a display device that includes a touch sensitive surface, sensor, or set of sensors that accept input from a user. For example, touch sensitive display device 354 may detect when and where an object touches the screen, and may also detect movement of an object across the screen. When touch sensitive display device 354 detects input, display controller 352 and processor 350 (in association with user interface component 321) determine the appropriate response. For example, in response to user input, applications may be started, icons may be moved, or a user signature may be stored.

Touch sensitive display device 354 may be manufactured using any applicable display technologies, including for example, liquid crystal display (LCD), active matrix organic light emitting diode (AMOLED), and the like. Further, touch sensitive display device 354 may be manufactured using any application touch sensitive input technologies, including for example, capacitive and resistive touch screen technologies, as well as other proximity sensor technologies.

WiFi radio 358 may be any type of radio capable of communicating over a wireless network. Examples include radios that are compatible with one or more of the Institute of Electrical and Electronics Engineers (IEEE) 802.11 standards. In some embodiments, WiFi radio 358 is omitted.

Cellular radio 360 may be any type of radio that can communicate within a cellular network. Examples include, but are not limited to, radios that communicate using orthogonal frequency division multiplexing (OFDM), code division multiple access (CDMA), time division multiple access (TDMA), and the like. Cellular radio 360 may operate at any frequency or combination of frequencies without departing from the scope of the present invention. In some embodiments, cellular radio 360 is omitted.

Audio circuits 362 provide an interface between processor 350 and audio devices such as a speaker and microphone.

Camera 364 may be any camera suitable for use in a mobile device. For example, camera 364 may include a CMOS sensor with optics or any other type of image capture device at any resolution. Camera 364 may be operated by a camera software application (not shown) or may be operated by check image generator application 110. Not all embodiments of the present invention utilize camera 364. Example embodiments in which camera 364 is operated by check image generator application 110 are discussed further below.

Accelerometer 366 detects motion of mobile device 102. In some embodiments, data from accelerometer 366 is used by check image generator application 110 to determine if camera 364 is to be used during check image generation. This is described further below.

Secure element 368 provides secure information storage. In some embodiments, secure element 368 is a smartcard compatible secure element commonly found in credit card applications and/or security applications. NFC radio 370 provides near field communications capability between mobile device 102 and other devices nearby. In some embodiments, NFC radio 370 may operate at 13.56 megahertz, although this is not a limitation of the present invention.

In some embodiments, secure element 368 is combined with NFC radio 370 in a single integrated circuit such as a smartcard controller. In other embodiments, secure element 368, or a combination of secure element 368 and NFC radio 370 are integrated into another semiconductor device such as processor 350.

Examples of smart card controllers that combine secure element 368 with NFC radio 370 are the "SmartMX" controllers sold by NXP Semiconductors N.V. of Eindhoven, The Netherlands. In some embodiments, the secure element has an ISO/IEC 7816 compatible interface that communicates with other components within mobile device 102 (e.g., processor 350), although this is not a limitation of the present invention. Further, in some embodiments, NFC radio 370 has an ISO/IEC 14443 contactless interface.

Mobile device 102 may include many other circuits and services that are not specifically shown in FIG. 3. For example, in some embodiments, mobile device 102 may include a global positioning system (GPS) radio, a Bluetooth radio, haptic feedback devices, and the like. Any number and/or type of circuits and services may be included within mobile device 102 without departing from the scope of the present invention.

Memory 310 may include any type of memory device. For example, memory 310 may include volatile memory such as static random access memory (SRAM), or nonvolatile memory such as FLASH memory. Memory 310 is encoded with (or has stored therein) one or more software modules (or sets of instructions), that when accessed by processor 350, result in processor 350 performing various functions. In some embodiments, the software modules stored in memory 310 may include an operating system (OS) 320 and applications 330. Applications 330 may include any number or type of applications. Examples provided in FIG. 3 include a telephone application 331, a contacts application 332, a music player application 333, a mobile banking application 335, and a check image generator application 110. Memory 310 may also include any amount of space dedicated to data storage 340.

Operating system 320 may be a mobile device operating system such as an operating system to control a mobile phone, smartphone, tablet computer, laptop computer, or the like. As shown in FIG. 3, operating system 320 includes user interface component 321. Operating system 320 may include many other components without departing from the scope of the present invention.

User interface component 321 includes processor instructions that cause mobile device 102 to display content on touch sensitive display device 354, recognize user input, and to provide the user input to applications. User interface component 321 also includes instructions to display menus, move icons, and manage other portions of the display environment.

Telephone application 331 may be an application that controls a cell phone radio. Contacts application 332 includes software that organizes contact information. Contacts application 332 may communicate with telephone application 331 to facilitate phone calls to contacts. Contacts application 332 may also communicate with check image generator application 110 to facilitate writing checks to contacts. Music player application 333 may be a software application that plays music files that are stored in data store 340.

Mobile banking application 335 may be a software application that communicates with a banking service to allow banking functions such as balance inquiries, funds transfers, bill payment and the like. Mobile banking application 335 may be a downloaded "thick" application, or may be a "thin" application that uses internet browser functionality. Other application examples include applications that store an identity such as a passport or a building access identity.

In some embodiments, mobile banking application 335 includes processor instructions that allow mobile device 102 to perform mobile payments. For example, mobile banking application 335 may include processor instructions that handle access to one or more payment instruments such as credit cards, debit cards, and pre-paid cards. In some embodiments, mobile banking application 335 communicates with smartcard secure element 368 and/or NFC radio 370 within mobile device 102. For example, mobile banking application 335 may store and access payment identities in smartcard secure element 368 and allow proximity payments using NFC radio 370.

Check image generator application 110 is a software application that includes instructions that when executed allow mobile device 102 to produce RDC compatible check images. Further, in some embodiments, check image generator application 110 transmits an RDC compatible check image to another mobile device using one or more of the radios present in mobile device 102. For example, an RDC compatible check image may be transmitted using WiFi radio 358, cell radio 360, or NFC radio 370.

Each of the above-identified applications correspond to a set of instructions for performing one or more functions described above. These applications (sets of instructions) need not be implemented as separate software programs, procedures or modules, and thus various subsets of these applications may be combined or otherwise re-arranged in various embodiments. For example, telephone application 331 may be combined with contacts application 332. Further-more, memory 310 may store additional applications (e.g., video players, camera applications, etc.) and data structures not described above.

It should be noted that device 102 is presented as an example of a mobile device, and that device 102 may have more or fewer components than shown, may combine two or more components, or may have a different configuration or arrangement of components. For example, mobile device 102 may include many more components such as sensors (optical, touch, proximity etc.), or any other components suitable for use in a mobile device.

Memory 310 represents a computer-readable medium capable of storing instructions, that when accessed by processor 350, result in the processor performing as described herein. For example, when processor 350 accesses instructions within check image generator application 110, processor 350 generates an RDC compatible check image that can be transmitted to a recipient mobile such as recipient mobile device 120 (FIG. 1).

Figure 4:
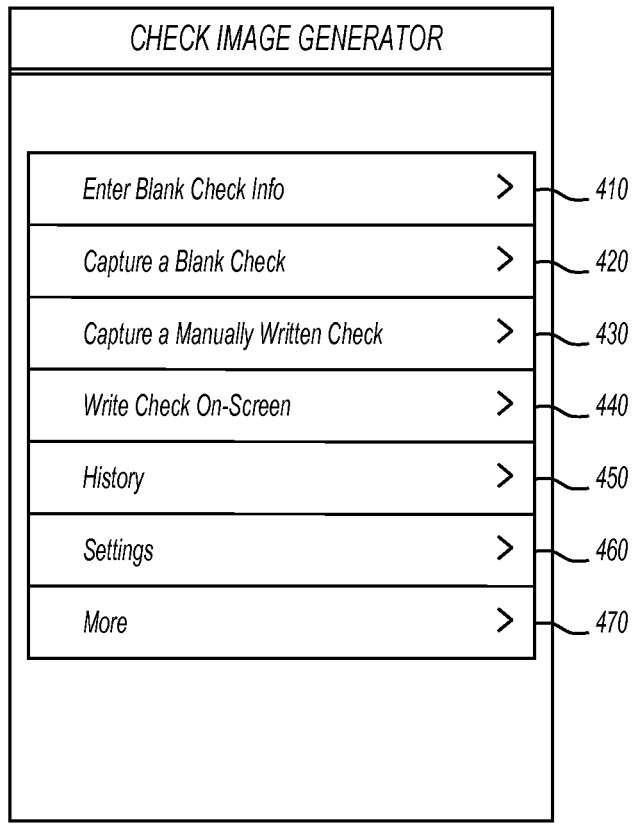
FIG. 4 shows a mobile device screen shot of a check image generator application in accordance with various embodiments of the present invention.

FIG. 4 shows a mobile device screen shot of a check image generator application in accordance with various embodiments of the present invention. Screen 400 may be displayed on touch sensitive display device 354 when check image generator application 110 is executed by processor 350. In some embodiments, portions of user interface 321 may also be executed to display the menu items on screen 400.

Screen 400 shows an example menu structure that implements functionality provided by check image generator application 110. For example, blank check information may be entered by a user when menu item 410 is selected; a blank check may be captured when menu item 420 is selected; a manually written check may be captured when menu item 430 is selected; a check may be written on-screen when menu item 440 is selected; check history may be shown when menu item 450 is selected; applications settings may be displayed when menu item 460 is selected; and more options may be displayed when menu item 470 is selected.

Figure 5:
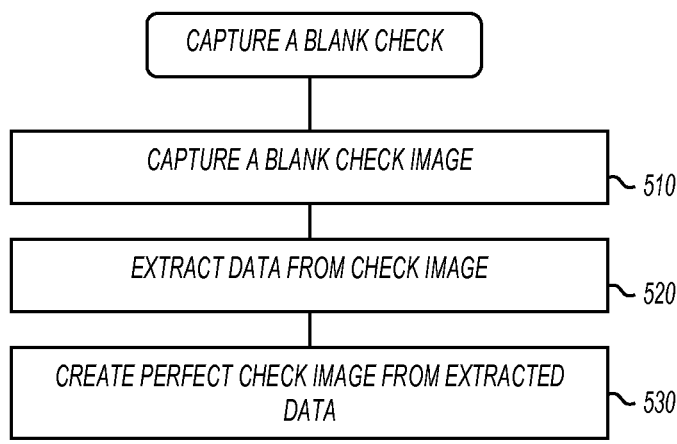
FIG. 5 shows a flowchart of a method for capturing a blank check in accordance with various embodiments of the present invention.

FIG. 5 shows a flowchart of a method for capturing a blank check in accordance with various embodiments of the present invention. In some embodiments, method 500 may be performed by a mobile device such as mobile device 102 or mobile device 120. Further, in some embodiments, method 500 may be performed by a processor that is executing software such as check generator application 110 and/or mobile banking application 335. Method 500 is not limited by the type of system or entity that performs the method. The various actions in method 500 may be performed in the order presented, in a different order, or simultaneously. Further, in some embodiments, some actions listed in FIG. 5 are omitted from method 500.

In some embodiments, method 500 is performed by check image generator application 110 when a user selects menu item 420 to capture a blank check image. At 510, the blank check image is captured. In some embodiments, this corresponds to a user taking a photograph of a blank check with camera 364. In other embodiments, this corresponds to a user loading a stored image of a blank check. At 520, data is extracted from the check image. The extracted data may include a routing number, account number, bank name, user name and address, and/or any other static check information. "Static check information" refers to information that does not vary between checks for a common account. This is in contrast to "dynamic check information" which includes data that may change between checks for a common account. Examples of dynamic check information include payee information, check amount, date, and the like. The data extraction may take place using known techniques such as optical character recognition (OCR). In some embodiments, only the front of the blank check is imaged, and in other embodiments, both the front and back of the check are imaged.

Image processing may or may not be performed prior to extracting data from the check image. For example, if the check image is significantly distorted, image processing techniques may be employed to correct the image prior to data extraction. In embodiments where OCR of check information is the only goal, it is not necessary to process the check image to make it RDC compatible; image processing to render the check OCR readable is sufficient.

At 530, a "perfect" check image is created from the data extracted at 520. As used herein, the term "perfect check image" refers to a constructed image rather than a scanned image. For example, a template check image may be created with straight lines and right-angle corners, and this template image may be combined with extracted data such as routing number, account number, bank name, and user name and address to create a perfect blank check image. The resulting perfect blank check image does not suffer from degraded image quality that is typical of scanned checks. The perfect blank check image may be used in subsequent procedures to create RDC compatible check images as further described below.

In some embodiments, the perfect blank check image is stored for later use. For example, the perfect blank check image may be stored in nonvolatile memory within mobile device 102. In some embodiments, a library of perfect blank check images is stored. For example, a user may store one or more perfect blank images for each of multiple accounts.

Figure 6:
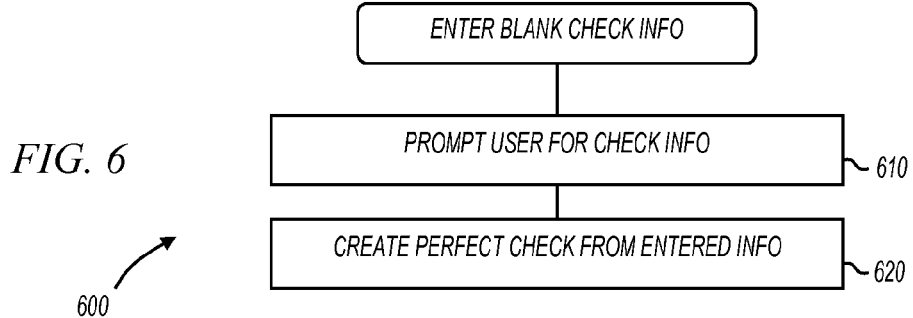
FIG. 6 shows a flowchart of a method for entering blank check information in accordance with various embodiments of the present invention.

FIG. 6 shows a flowchart of a method for entering blank check information in accordance with various embodiments of the present invention. In some embodiments, method 600 may be performed by a mobile device such as mobile device 102 or mobile device 120. Further, in some embodiments, method 600 may be performed by a processor that is executing software such as check generator application 110 and/or mobile banking application 335. Method 600 is not limited by the type of system or entity that performs the method. The various actions in method 600 may be performed in the order presented, in a different order, or simultaneously. Further, in some embodiments, some actions listed in FIG. 6 are omitted from method 600.

In some embodiments, method 600 is performed by check image generator application 110 when a user selects menu item 410 to enter blank check information. At 610, the user is prompted to enter check information. The check information may include a routing number, account number, bank name, user name and address, and/or any other information. In some embodiments, the check information entered by the user is limited to static check information. In other embodiments, the check information entered by the user includes both static and dynamic check information.

At 620, a "perfect" check image is created from the data entered at 610. As described above, the perfect check image is a constructed image rather than a scanned image. For example, a template check image may be created with straight lines and right-angle corners, and this template image may be combined with user-entered static check data such as routing number, account number, bank name, and payor name and address to create a perfect blank check image. The resulting perfect blank check image does not suffer from degraded image quality that is typical of scanned checks. The perfect blank check image may be used in subsequent procedures to create RDC compatible check images as further described below.

In some embodiments, the perfect blank check image is stored for later use. For example, the perfect blank check image may be stored in nonvolatile memory within mobile device 102. In some embodiments, a library of perfect blank check images is stored. For example, a user may store one or more perfect blank images for each of multiple accounts.

Figure 7:
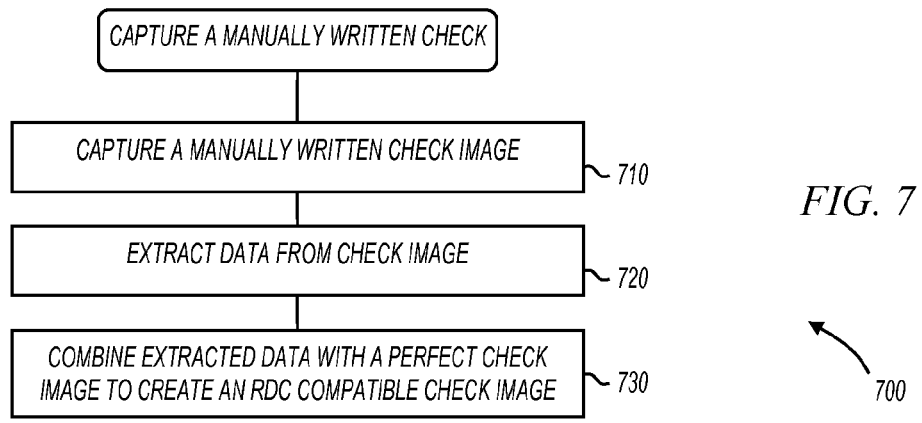
FIG. 7 shows a flowchart of a method for capturing a manually written check in accordance with various embodiments of the present invention.

FIG. 7 shows a flowchart of a method for capturing a manually written check in accordance with various embodiments of the present invention. In some embodiments, method 700 may be performed by a mobile device such as mobile device 102 or mobile device 120. Further, in some embodiments, method 700 may be performed by a processor that is executing software such as check generator application 110 and/or mobile banking application 335. Method 700 is not limited by the type of system or entity that performs the method. The various actions in method 700 may be performed in the order presented, in a different order, or simultaneously. Further, in some embodiments, some actions listed in FIG. 7 are omitted from method 700.

In some embodiments, method 700 is performed by check image generator application 110 when a user selects menu item 430 to capture an image of a manually written check. At 710, the manually written check image is captured. In some embodiments, this corresponds to a user taking a photograph of a filled-out check with camera 364. At 720, data is extracted from the check image. The extracted data may include a routing number, account number, bank name, payor name and address, payee name, amount, and/or any other information on the check. The data extraction may take place using known techniques such as optical character recognition (OCR). In some embodiments, only the front of the check is imaged, and in other embodiments, both the front and back of the check are imaged.

Image processing may or may not be performed prior to extracting data from the check image. For example, if the check image is significantly distorted, image processing techniques may be employed to correct the image prior to data extraction. In embodiments where OCR of check information is the only goal, it is not necessary to process the check image to make it RDC compatible; image processing to render the check OCR readable is sufficient.

At 730, the extracted data is combined with a "perfect" check image to create an RDC compatible check image. In some embodiments, the perfect check image is an image created using method 500, and in other embodiments, the perfect check image is an image created using method 600. The RDC compatible check image created at 730 does not suffer from degraded image quality that is typical of scanned checks.

Figure 8:
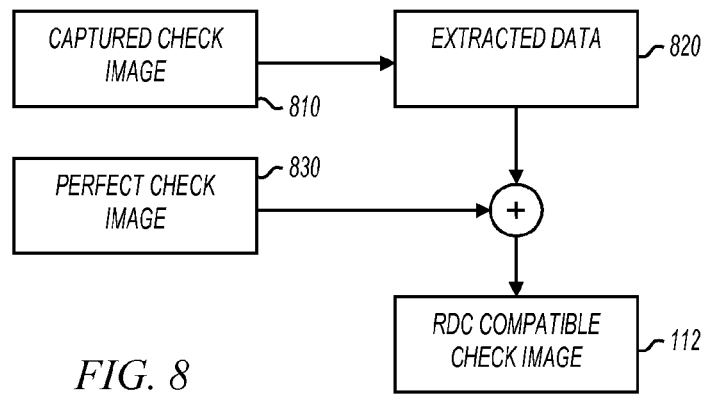
FIG. 8 shows data flow in accordance with the method of FIG. 7.

FIG. 8 shows data flow in accordance with the method of FIG. 7. Captured check image 810 is a check image captured at 710. In some embodiments, image 810 includes images of both the front and back of the check, and in other embodiments, image 810 includes only an image of the front of the check. The extracted data is shown at 820. As described above with reference to FIG. 7, the data at 820 is extracted from the check image 810 and may include any information from the manually written check.

The perfect check image 830 is a non-scanned pre-prepared check image that when combined with additional data, becomes an RDC compatible check image. In some embodiments, perfect check image 830 has straight lines and right-angle corners. Further, in some embodiments, perfect check image 830 may also include static check data such as a routing number, account number, and payor information. Some embodiments of perfect check image 830 do not include static data, and this information is included in the extracted data 820.

RDC compatible check image 112 is created when extracted data 820 is combined with perfect check image 830. RDC compatible check image 840 is a non-scanned check image that satisfies RDC requirements imposed by RDC software and/or financial institutions.

Figure 9:
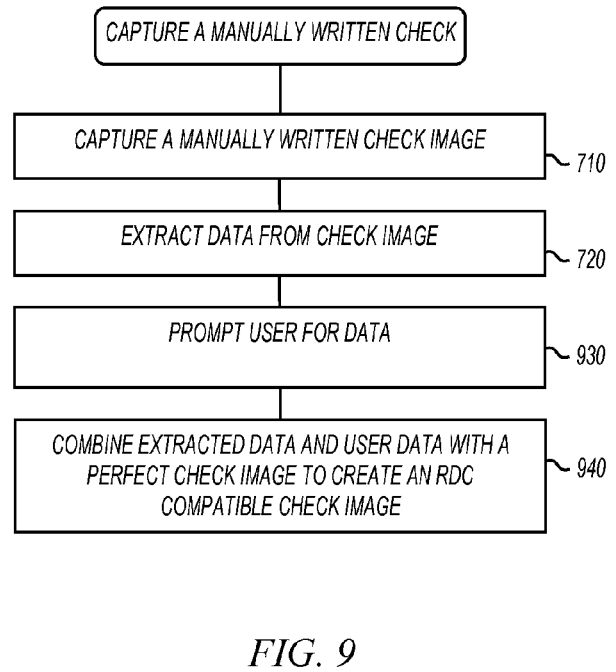
FIG. 9 shows a flowchart of a method for capturing a manually written check in accordance with various embodiments of the present invention.

FIG. 9 shows a flowchart of a method for capturing a manually written check in accordance with various embodiments of the present invention. In some embodiments, method 900 may be performed by a mobile device such as mobile device 102 or mobile device 120. Further, in some embodiments, method 900 may be performed by a processor that is executing software such as check image generator application 110 and/or mobile banking application 335. Method 900 is not limited by the type of system or entity that performs the method. The various actions in method 900 may be performed in the order presented, in a different order, or simultaneously. Further, in some embodiments, some actions listed in FIG. 9 are omitted from method 900.

In some embodiments, method 900 is performed by check image generator application 110 when a user selects menu item 430 to capture an image of a manually written check. The actions of 710 and 720 are the same as those described above with reference to FIG. 7. At the completion of the actions of 720, the manually written check image has been captured, and data has been extracted from the image.

At 930, the user is prompted to enter information. In some embodiments, the user is prompted to only enter dynamic check data such as payee information (e.g., payee name and amount). In other embodiments, the user is prompted to enter any information that was not recognized from the captured image, including dynamic information such as bank routing number and account number. In some embodiments, the user enters information using keystrokes. For example, a user may type information using a keyboard or enter information using a soft keyboard displayed on touch sensitive display device 354. In other embodiments, the user enters information by selecting from a list of possibilities. The list may be a pre-stored list maintained within check image generator application 110, or may be a list retrieved from other applications. For example, the user may be presented with a list of contacts from contacts application 332, and the user information may be retrieved from a selected contact.

At 940, the extracted data and the user data are combined with a "perfect" check image to create an RDC compatible check image. In some embodiments, the perfect check image is an image created using method 500, and in other embodiments, the perfect check image is an image created using method 600. In still further embodiments, the perfect check image is an image provided by a financial institution. The RDC compatible check image created at 940 does not suffer from degraded image quality that is typical of scanned checks.

Figure 10:
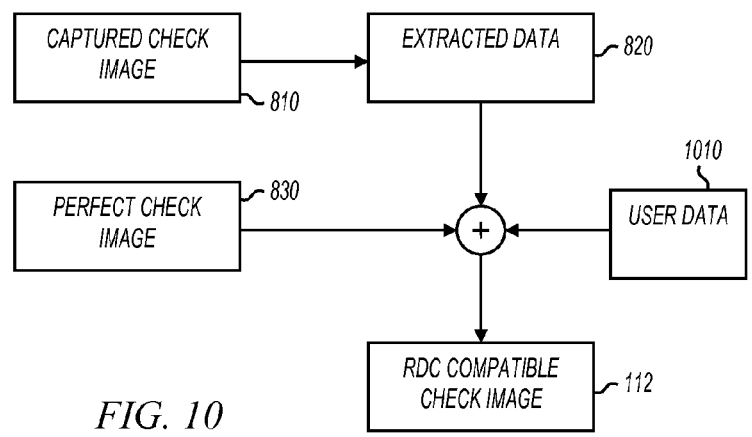
FIG. 10 shows data flow in accordance with the method of FIG. 9.

FIG. 10 shows data flow in accordance with the method of FIG. 9. As shown in FIG. 10, data extracted from the captured check image is combined with user data 1010 and a perfect check image to create an RDC compatible check image 112. Data used to complete the fields in RDC compatible check image 112 may originate from one or both of the extracted data and the user entered data. For example, in some embodiments, the extracted data may include static check information preprinted on the paper check (routing number, account number, check number, payor information), and the user entered data may include dynamic check information that would otherwise be manually filled in a paper check (payor name, amount, date).

Figure 11:
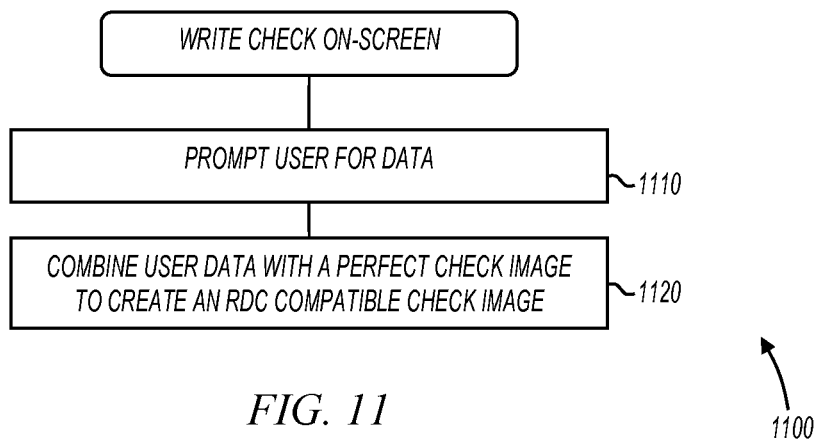
FIG. 11 shows a flowchart of a method for writing a check on screen in accordance with various embodiments of the present invention.

FIG. 11 shows a flowchart of a method for writing a check on-screen in accordance with various embodiments of the present invention. In some embodiments, method 1100 may be performed by a mobile device such as mobile device 102 or mobile device 120. Further, in some embodiments, method 1100 may be performed by a processor that is executing software such as check generator application 110 and/or mobile banking application 335. Method 1100 is not limited by the type of system or entity that performs the method. The various actions in method 1100 may be performed in the order presented, in a different order, or simultaneously. Further, in some embodiments, some actions listed in FIG. 11 are omitted from method 1100.

In some embodiments, method 1100 is performed by check image generator application 110 when a user selects menu item 440 to write a check on-screen. At 1110, the user is prompted to enter information. In some embodiments, the user is prompted for dynamic check information such as payee name and amount. In some embodiments, the user is prompted by displaying an outline of a check on touch sensitive display device 354. For example, check image generator application 110 may display the perfect image generated in method 500 or method 600. The perfect check image may have any number of fields filled in, and any number of fields blank. The user is prompted to enter information for blank fields such that all check information is gathered after the actions of 1110 are complete.

The perfect check may include any mix of static and dynamic check information. For example, the perfect check may be retrieved from memory with some dynamic check fields pre-populated. Check image generator application 110 may store a list of partially filled out perfect checks as a list of common payees. The user may be able to select from previous transactions to create the list of perfect checks. Check image generator application 110 may store any amount of information to auto-populate check fields, and this information may be stored securely or in the open. In some embodiments, this information is stored in a secure element such as secure element 368 (FIG. 3). In other embodiments, the auto-population data is stored encrypted and the encryption key is stored in a secure element.

In some embodiments, multiple perfect check images are maintained and the user is prompted which perfect check image to use. The various perfect check images may correspond to different financial institutions, different accounts, different payees, previously transmitted checks to be used as templates, and the like.

At 1120, the user data is combined with the perfect check image to create an RDC compatible check image. In some embodiments, the perfect check image is an image created using method 500, and in other embodiments, the perfect check image is an image created using method 600. The RDC compatible check image created at 1120 does not suffer from degraded image quality that is typical of scanned checks.

Figure 12:
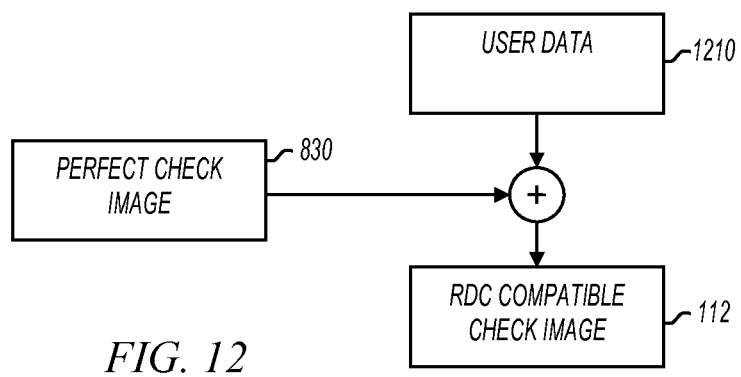
FIG. 12 shows data flow in accordance with the method of FIG. 11.

FIG. 12 shows data flow in accordance with the method of FIG. 11. User data 1210 is the data entered by the user at 1110 (FIG. 11). FIG. 12 shows the user data 1210 being combined with the perfect check image to create RDC compatible check image 112.

Figure 13:
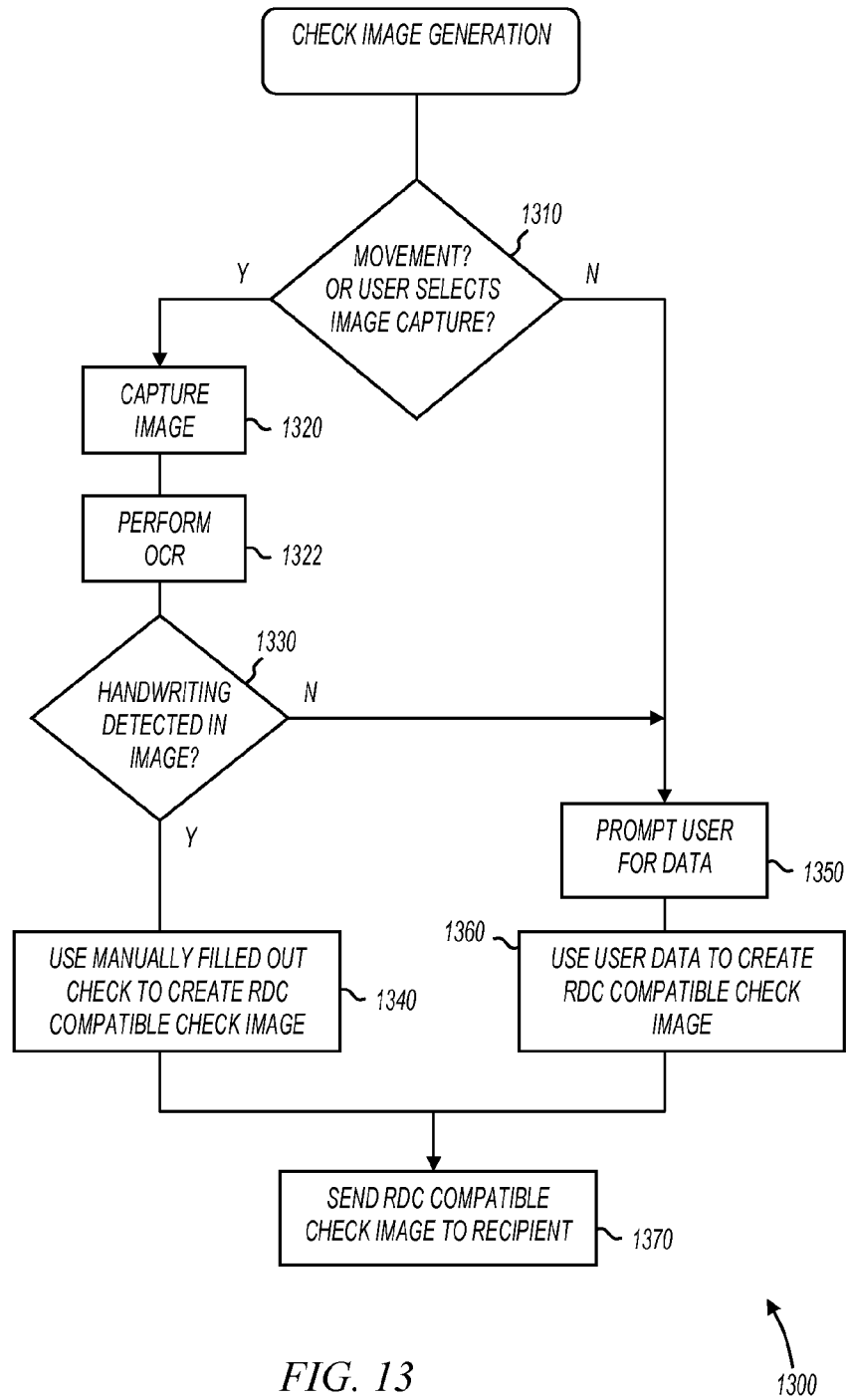
FIG. 13 shows a flowchart of methods in accordance with various embodiments of the present invention.

FIG. 13 shows a flowchart of methods in accordance with various embodiments of the present invention. In some embodiments, method 1300 may be performed by a mobile device such as mobile device 102 or mobile device 120. Further, in some embodiments, method 1300 may be performed by a processor that is executing software such as check image generator application 110 and/or mobile banking application 335. Method 1300 is not limited by the type of system or entity that performs the method. The various actions in method 1300 may be performed in the order presented, in a different order, or simultaneously. Further, in some embodiments, some actions listed in FIG. 13 are omitted from method 1300.

In some embodiments, method 1300 is performed by check image generator application 110 when the application is started. As described below, method 1300 automatically decides whether to capture an image or prompt a user for information based on detected movement of the mobile device.

At 1310, method 1300 checks whether the mobile device is moving. In some embodiments, this is achieved by monitoring the state of accelerometer 366. If movement is detected, then method 1300 continues with the actions of 1320 in which a check image is captured. In some embodiments, the image is captured with camera 364 (FIG. 3).

A user may purposely move the mobile device to signal to the check image generator application that the user wishes to capture an image, or alternatively, the movement may be the natural movement as the user is positioning the mobile device to take a picture of the check.

The check image captured at 1320 may be of a blank check or of a manually written check. Any amount of static check information and dynamic check information may be contained on the face of the check. For example, when a blank check image is captured, only static check information may be included in the resulting captured image. Also for example, when a manually filled out check is captured, both static and dynamic check information may be included in the resulting captured image.

At 1322, optical character recognition (OCR) is performed. In some embodiments, some image processing may be performed prior to performing OCR. For example, the captured image may be binarized to remove color depth. Also for example, the image may be transformed through translation, rotation, or warping to increase OCR reliability. The OCR operation may result in character recognized static check information. For example, bank routing number, account number, and payor personal information may be character recognized. The OCR operation may also result in character recognized dynamic check information. For example, payee name, amount, and date information may be character recognized. Still further, the OCR operation may determine that handwriting exists, and characters within the handwriting may or may not be recognized.

At 1330, a determination is made whether handwriting is detected in the image captured at 1320. If handwriting is detected and all static and dynamic check data for all check fields is found in the image, then the data extracted from the check is combined with a perfect check image to create an RDC compatible check image at 1340. In some embodiments, the actions of 1340 include actions described above with reference to method 700 (FIG. 7) or method 900 (FIG. 9). For example, even though all dynamic check information is found in the image, method 1300 may still prompt the user for dynamic check information (930, FIG. 9).

If no movement is detected at 1310, or if not all static and dynamic check information is present at 1330, then the user is prompted for data at 1350, and the user data is combined with a perfect check image to create an RDC compatible check image at 1360. In some embodiments, the actions of 1360 may include any method embodiments described above that combine user data with a perfect check image to create an RDC compatible check image. For example, the actions of 1360 may include actions described above with reference to method 600 (FIG. 6) or method 900 (FIG. 9). In some embodiments, the user data is used to augment a perfect check image to create the RDC compatible check image. In further embodiments, the user data and character recognized data are both used to augment a perfect check image to create the RDC compatible check image.

As shown at 1310, in some embodiments, movement can be used to determine whether to capture an image or prompt a user for data. Also as shown at 1310, a user may override the movement feature by selecting image capture or selecting to enter user information.

After generation of the RDC compatible check image, the RDC compatible check image is transmitted to a recipient at 1370. Transmission of the RDC compatible check image may use any transport mechanism. For example, the RDC compatible check image may be sent via email, MMS, using an NFC radio, over a WiFi link, or the like.

At the completion of any of the foregoing methods, the RDC compatible check image 112 may be sent from the sender mobile device to the recipient mobile device. In some embodiments, the RDC compatible check image 112 is sent as soon as it is completed, and in other embodiments, the user is prompted to review the check prior to clicking a clicking a "send" button on the screen.

In some embodiments, check image generator application 110 works collaboratively with contacts application 332. For example, when a user is prompted for payor information, the check image generator application 110 may allow the user to select a contact from the contacts database. In these embodiments, the user may select a contact when prompted for data, and the check fields are filled out to the extent possible using data from the contacts database.

Figure 14:
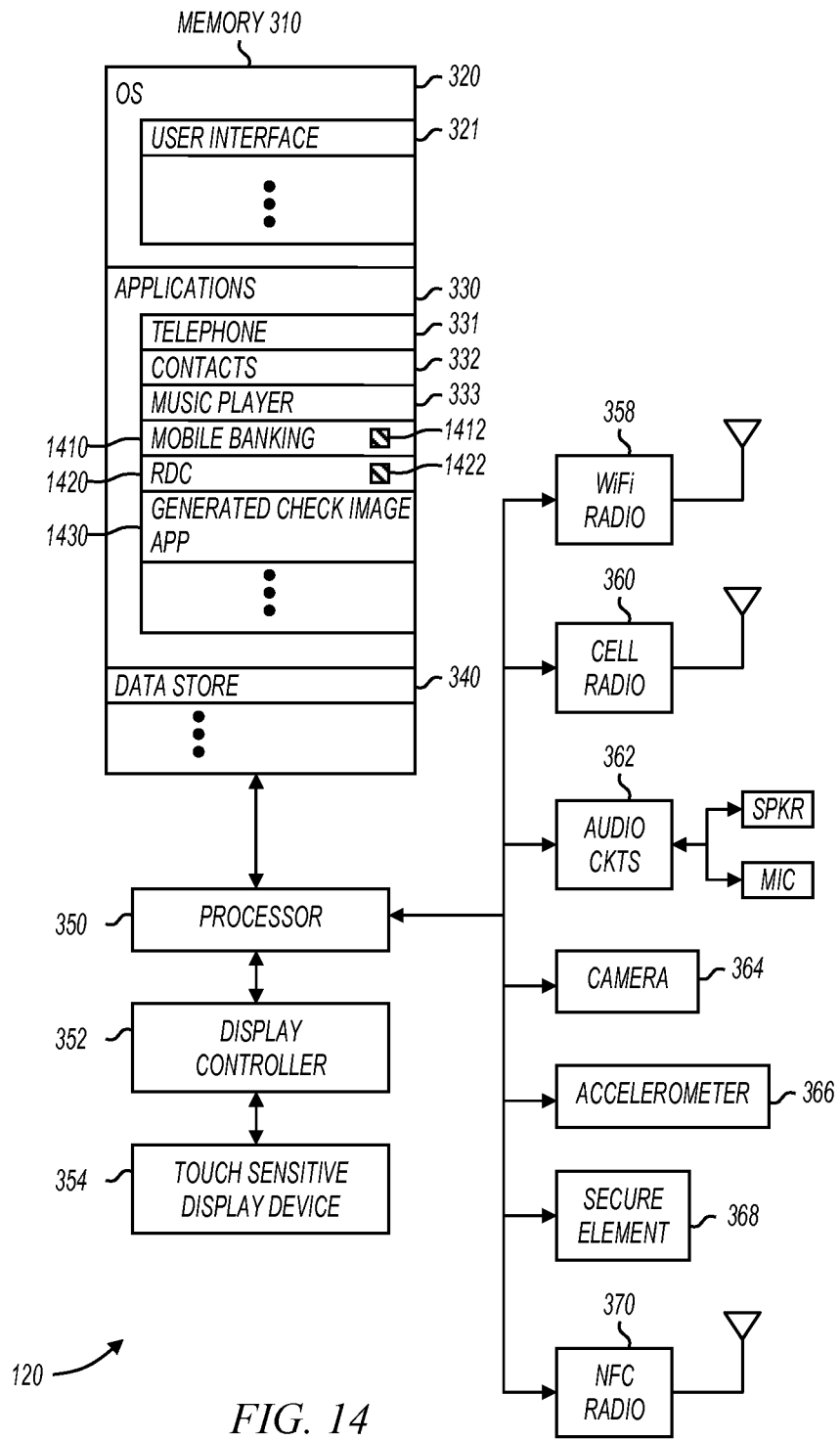
FIG. 14 shows a block diagram of a mobile device in accordance with various embodiments of the invention.

FIG. 14 shows a block diagram of a mobile device in accordance with various embodiments of the invention. The mobile device shown in FIG. 14 represents a recipient mobile device such as recipient mobile device 120 (FIG. 1) having remote deposit capture functionality. Mobile device 120 includes many if not all of the components that are included in mobile device 102. In some embodiments, the same model of mobile device may be used for both sender mobile device 102 (FIG. 3) and mobile device 120, where each of the mobile devices has different software applications installed (e.g., check image generator application 110 vs. RDC application 1420).

Mobile device 120 is shown with mobile banking application 1410, remote deposit capture application 1420, and generated check image application 1430. In operation, any of these applications may receive an RDC compatible check image and forward it to a bank for deposit. For example, generated check image application 1430 may be a standalone application designed specifically for reception of an RDC compatible check image. This application differs from prior art RDC applications in that it does not include check image capture capabilities. It only receives already well-formed RDC compatible check images from sender mobile devices.

Mobile banking application 1410 may be an application with RDC compatible check image reception capabilities along with banking functions such as balance inquiries, funds transfers, bill payment and the like. For example, mobile banking application 1410 may include a menu screen with one menu selection providing access to RDC compatible check image reception. The RDC compatible check image reception functions may be provided by an application programming interface, symbolized at 1412 in FIG. 14.

Remote deposit capture (RDC) application 1420 may be an application with RDC compatible check image reception capabilities along with other remote deposit capture functions such as check image capture, image processing, and character recognition. For example, RDC application 1420 may include a menu screen with one menu selection providing access to RDC compatible check image reception. The RDC compatible check image reception functions may be provided by an application programming interface, symbolized at 1422 in FIG. 14.

Various RDC compatible check image reception embodiments described below may be embodied in a mobile banking application, an RDC application, a standalone application, application programming interface, or any other suitable application.

Figure 15:
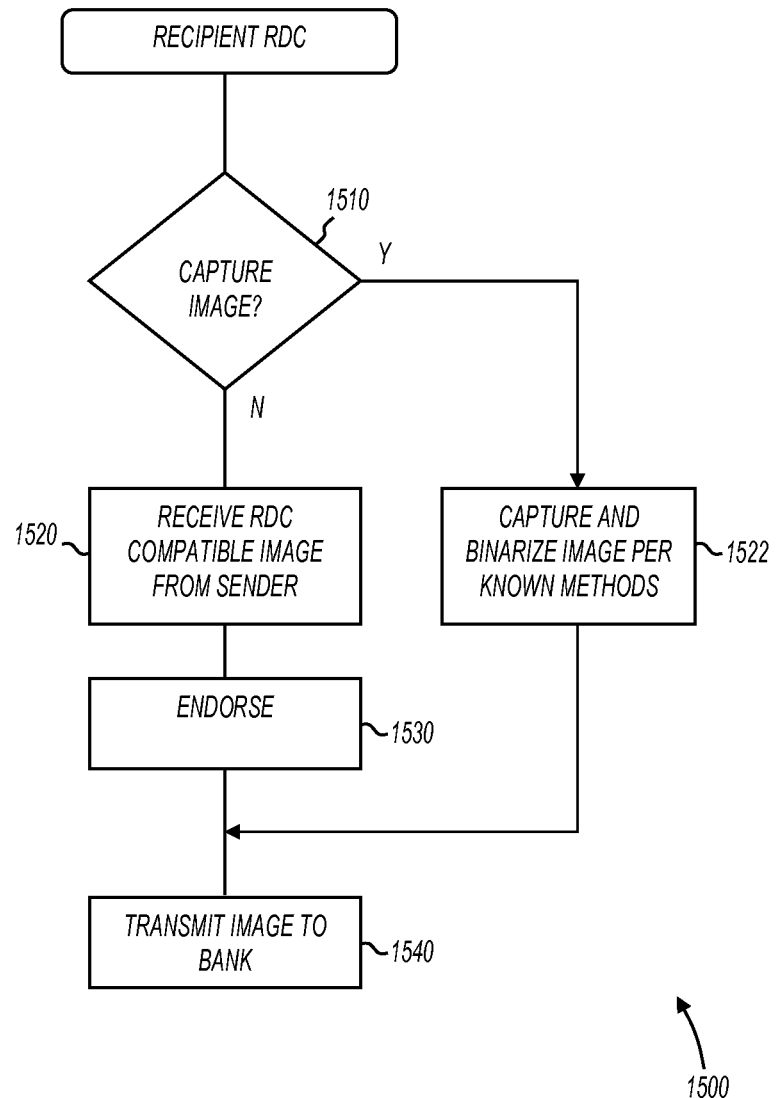
FIG. 15 shows a flowchart of methods in accordance with various embodiments of the present invention.

FIG. 15 shows a flowchart of methods in accordance with various embodiments of the present invention. In some embodiments, method 1500 may be performed by a mobile device such as mobile device 102 or mobile device 120. Further, in some embodiments, method 1500 may be performed by a processor that is executing software such as RDC application 1420 and/or mobile banking application 1410. Method 1500 is not limited by the type of system or entity that performs the method. The various actions in method 1500 may be performed in the order presented, in a different order, or simultaneously. Further, in some embodiments, some actions listed in FIG. 15 are omitted from method 1500.

In some embodiments, method 1500 is performed by RDC application 1420 when the application is started. As described below, method 1500 is capable of receiving an RDC compatible image from a sender mobile device, and is also capable of capturing an image of a paper check and performing remote deposit according to previously known methods.

Figure 16:
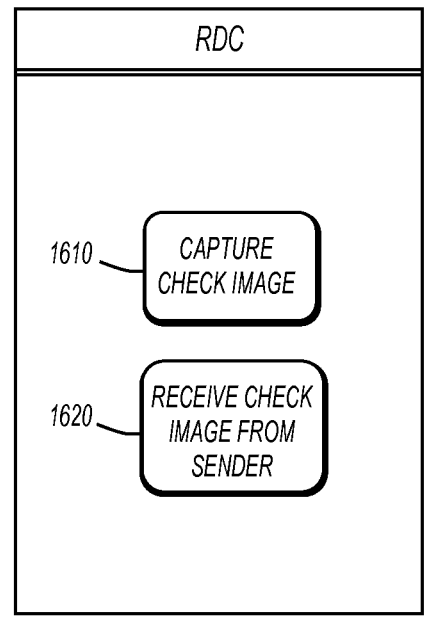
FIGS. 16-18 show mobile device screen shots of a remote deposit application in accordance with various embodiments of the present invention.

At 1510, method 1500 checks whether an image is to be captured. Referring now to FIG. 16, an example mobile device screen is shown that may be presented by RDC application 1420 to allow a user to select whether an image is to be captured or not. The user may select button 1610 if a check image is to be captured, or may select button 1620 if an RDC compatible check image is to be received from a sender.

Referring now back to FIG. 15, if an image is to be captured, then the image can be captured and binarized according to known methods. For example, the image may be captured and binarized in accordance with the teachings of U.S. Pat. No. 7,778,457.

If the image is not to be captured, then an RDC compatible check image may be received from a sender at 1520. In some embodiments, the RDC compatible check image may be received via email, and in other embodiments, the RDC compatible check image may be received via MMS. In still further embodiments, the RDC compatible check image may be retrieved from a server or a social networking site.

In some embodiments, the received RDC compatible check image includes images of both the front and back of a check. In other embodiments, the received RDC compatible check image includes only an image of the front of the check.

At 1530, the check image is endorsed. The check image may be endorsed in any manner that is acceptable to the bank at which the check is to be deposited. For example, in some embodiments, a user may electronically endorse the RDC compatible check image by typing a name enclosed in slashes (e.g., "/signature/"), or may provide an actual signature by signing directly on touch sensitive display device 354. In other embodiments, a user may have a saved endorsement stamp that is applied to the RDC compatible check image. In still further embodiments, endorsement is omitted.

At 1540, the check image is transmitted to the bank. In some embodiments, the check image transferred to the bank may be an image captured and processed by the recipient mobile device per the actions 1522. In these embodiments, a paper check has been transferred between the payor and the payee, and the payee has performed RDC functions with the paper check per the actions of 1522. In these embodiments, the check image is RDC compatible, but is still typically a processed picture of a paper check. In other embodiments, the check image transferred to the bank may be an RDC compatible check image generated by a sender mobile device. In these embodiments, a paper check has not been transferred between the payor and the payee. Further, in these embodiments, the check image is not only RDC compatible, but may also be formed from a "perfect" check image as described above.

FIG. 16 shows a mobile device screen shot of a remote deposit application in accordance with various embodiments of the present invention. As described above with reference to FIG. 15, a user may select to capture an image by selecting button 1610 or may select to receive an RDC compatible check image from a sender by selecting button 1620. In some embodiments, RDC compatible check image reception is added an existing mobile remote deposit capture application or an existing mobile banking application by adding button 1620 to a screen within the existing application. This may be accomplished by incorporating an API such as API 1412 or 1422 into the existing application, and performing appropriate function calls or object instantiations.

In some embodiments, when button 1620 is selected, a separate application is launched to perform the associated actions. In other embodiments, a web page is opened that allows the user to perform the associated actions. The web page may be served by a check control server. See check control server 1900 (FIGS. 19-23).

Figure 17:
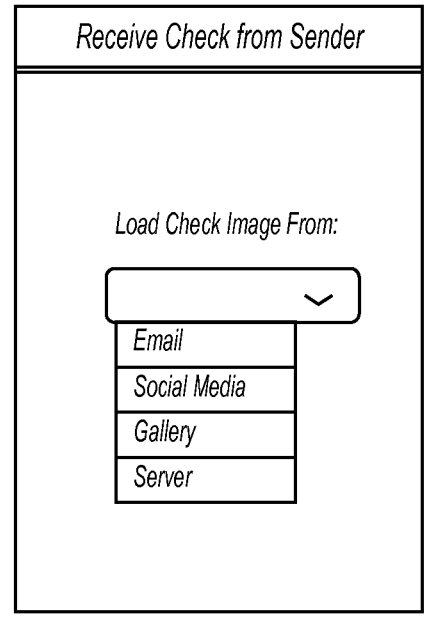

FIG. 17 shows a mobile device screen shot of a remote deposit application in accordance with various embodiments of the present invention. Screen 1700 may be displayed to a user to implement the actions of 1520 (FIG. 15). When a user wishes to receive an RDC compatible check image from a sender, screen 1700 or a similar screen may be displayed. Screen 1700 allows a user to specify the source of the RDC compliant check image. Example sources include email, social media, a saved picture (gallery), a server, and MMS. Any other source may be included without departing from the scope of the present invention.

Figure 18:
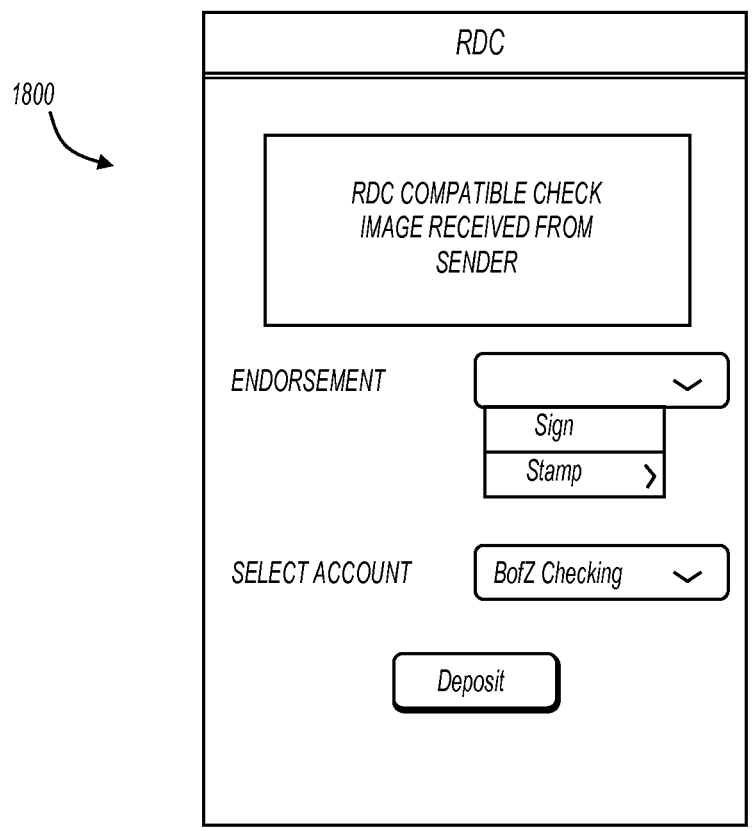

FIG. 18 shows a mobile device screen shot of a remote deposit application in accordance with various embodiments of the present invention. Screen 1800 may be displayed to a user to implement the actions of 1530 (FIG. 15). When a user wishes to endorse an RDC compatible check image received from a sender, screen 1800 or a similar screen may be displayed. Screen 1800 allows a user to specify the type of endorsement to be performed (e.g., sign, stamp, etc.) and also to specify the bank to which the check will be sent.

The various mobile device screens shown may be made available to other applications through the user of an application programming interface (API). For example, RDC application 1420 (FIG. 14) may have access to these screens and their associated functionality through API 1422. Also for example, mobile banking application 1410 may have access to these screens and their associated functionality through API 1412.

Figure 19:
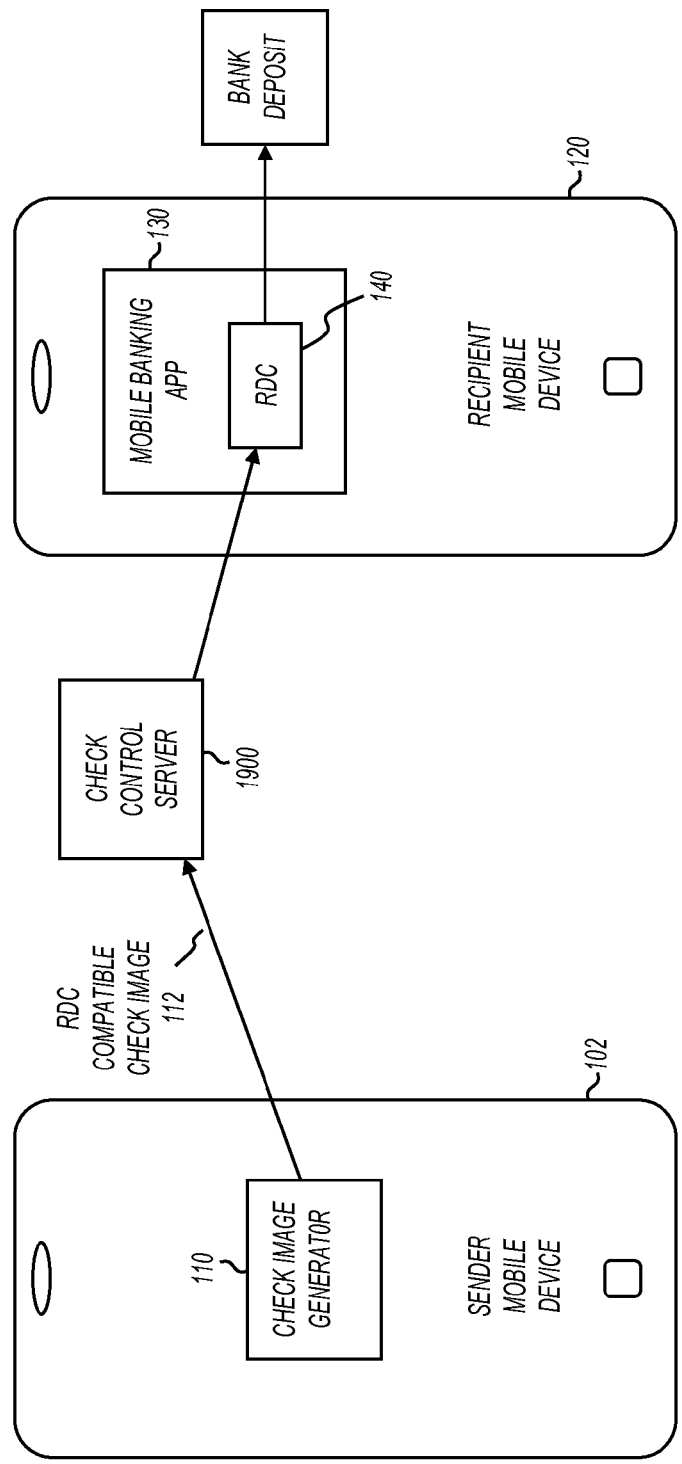
FIGS. 19-23 show diagrams of mobile remote deposit systems in accordance with various embodiments of the present invention.

FIG. 19 shows a diagram of a mobile remote deposit system in accordance with various embodiments of the present invention. The system shown in FIG. 19 includes sender mobile device 102 and recipient mobile device 120, which are discussed above. The system of FIG. 19 also includes check control server 1900. Check control server 1900 is a computer server accessibly by both sender mobile device 102 and recipient mobile device 120. In operation, check control server 1900 receives RDC compatible check images from sender mobile device 102, and stores them for later delivery to recipient mobile 120. Check control server 1900 may be a single computer or a network service provided by a series of networked servers.

Figure 20:
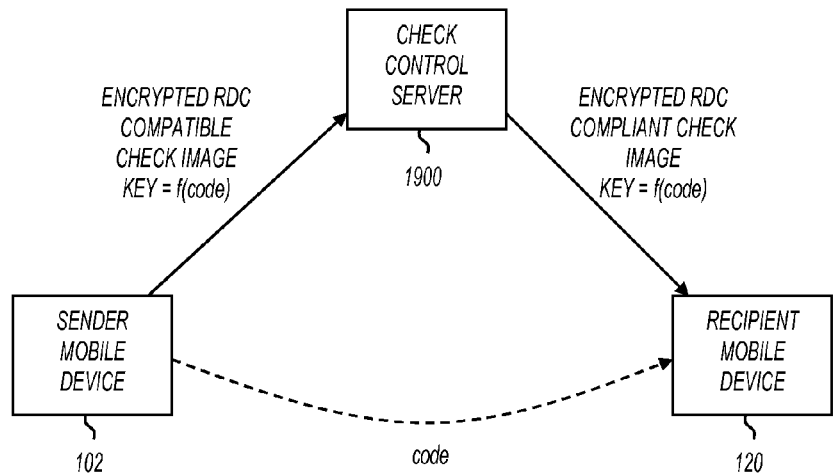
Figure 21:
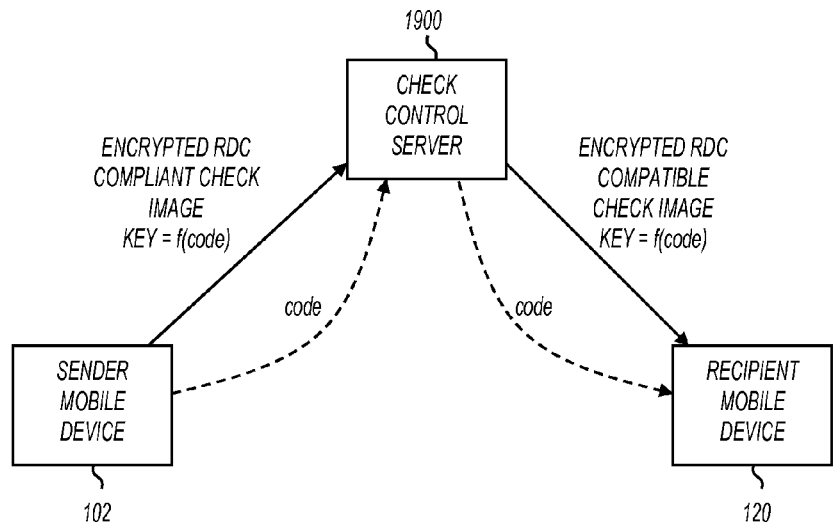
Figure 22:
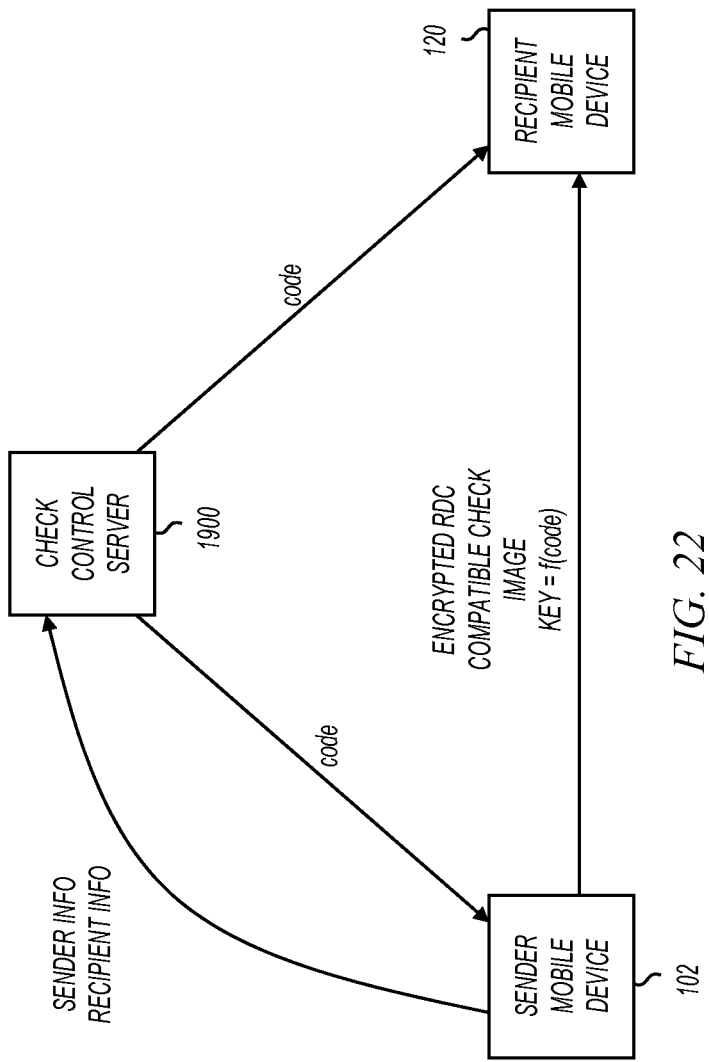

FIGS. 20-22 show diagrams of a mobile remote deposit system in accordance with various embodiments of the present invention. Each of the systems of FIGS. 20-22 include sender mobile device 102, recipient mobile device 120, and check control server 1900. Each of the systems shown in FIGS. 20-22 also exchange an encrypted RDC compatible check image.

In FIGS. 20 and 21, the encrypted RDC compatible check image is stored on the check control server, and in FIG. 22, the encrypted RDC compatible check image is delivered from the sender mobile device to the recipient mobile device without passing through check control server 1900. In embodiments represented by FIG. 20, the encrypted RDC compatible check image is stored on check control server 1900, and the code is send to recipient mobile device using a separate communication channel. In some embodiments, the code is sent directly between mobile devices using email or MMS.

In embodiments represented by FIG. 21, the encrypted RDC compatible check image is stored on check control server 1900, as is the code. In some embodiments, the user of recipient mobile device 120 may authenticate to check control server 1900 to receive both the encrypted RDC compatible check image and the code from which the decryption key can be determined.

In embodiments represented by FIG. 22, the encrypted RDC compatible check image is transferred between sender mobile device 102 and recipient mobile device 120 without passing through check control server 1900, although the code may be stored on check control server 1900. In some embodiments, the code is determined using sender info and receiver info provided by sender mobile device 102, and the code is provided both the sender mobile device and the recipient mobile device.

Figure 23:
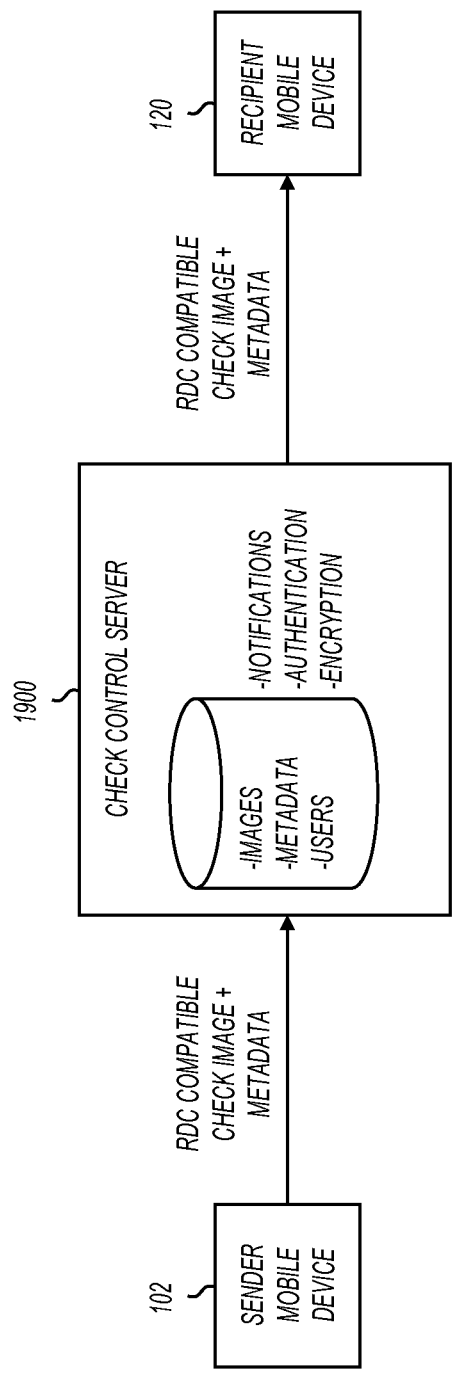

FIG. 23 shows a diagram of a mobile remote deposit system in accordance with various embodiments of the present invention. In embodiments represented by FIG. 23, check control server stores RDC compatible check images along with metadata and user data. Metadata may include information that describes the underlying check document or provides security, or may include information describing the payor, the payee, or communications between the payor and payee. For example, metadata may include codes encoded in the image but invisible to the human eye. Metadata may also include timestamp codes or timestamp derived codes. In some embodiments, encoded invisible content or timestamp or timestamp derived codes are used to further validate the authenticity of the originating check. Check control server 1900 may provide this service to the recipient's bank.

Also for example, metadata may include a check background pattern selected by the payor that is to be displayed to the payee. See, for example, screen 1800 (FIG. 18), where the RDC compatible check image display may be influenced by the metadata. Also for example, metadata may include data that specifies an image to be displayed other than the RDC compatible check image. Examples are described below with reference to FIG. 27. Metadata services (such as personalized check backgrounds and images) may be a premium service for which users pay extra. In some embodiments, users agree to pay extra when making a menu selection, and an RDC compatible check is generated for the payment and the RDC compatible check is automatically sent to the service provider.

In operation, the user of sender mobile device 102 (typically the payor) generates the RDC compatible check image as described above. The user of sender mobile device 102 also specifies metadata to be sent. Both the RDC compatible check image and the metadata are stored on check control server 1900 for later retrieval by the user of recipient mobile device 120 (typically the payee).

In some embodiments, check control server 1900 enforces authentication policies for one or both of the users of sender mobile device 102 and recipient mobile device 120. For example, a payor may authenticate to check control server 1900 prior to sending an RDC compatible check image, and a payee may authenticate to check control server 1900 prior to receiving an RDC compatible check image.

Some systems include a combination of sender mobile device 102 and check control server 1900. For example, a single entity may market systems that perform the functions of both sender mobile device 102 and check controls server 1900. Other systems include a combination of recipient mobile device 120 and check control server 1900. For example, a single entity may market system that perform the functions of both check control server 1900 and recipient mobile device 120.

Figure 24:
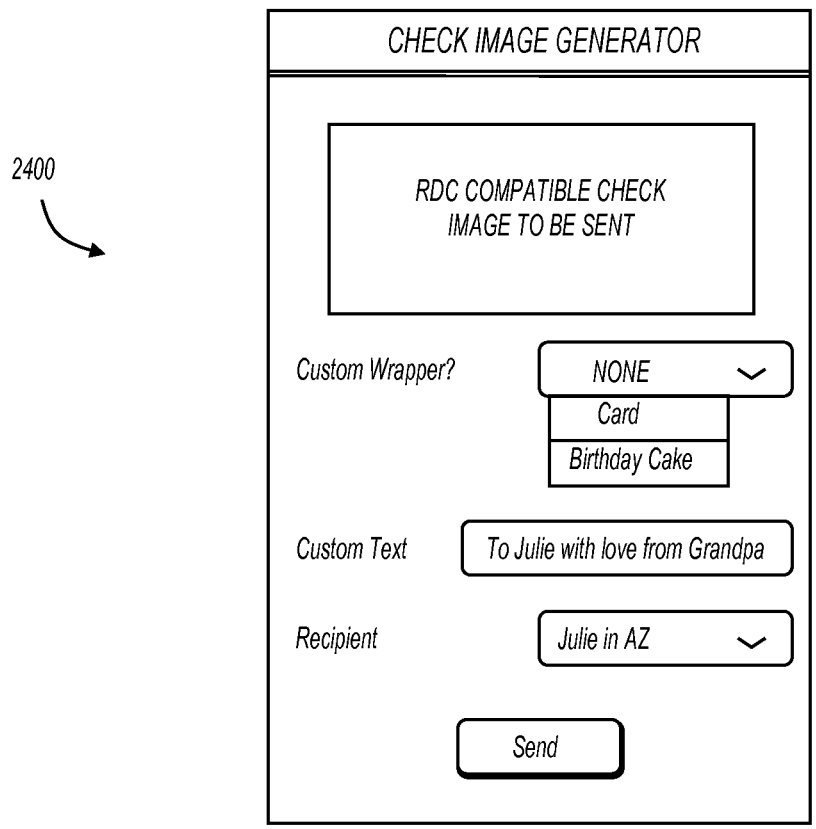
FIG. 24 shows a mobile device screen shot of a check image generator application in accordance with various embodiments of the present invention.

FIG. 24 shows a mobile device screen shot of a check image generation application. Mobile device screen 2400 may be presented to a user of sender mobile device 102. Screen 2400 displays the RDC compatible check image that is to be sent to a recipient. Screen 2400 also allows a user to specify a "custom wrapper" that includes an image to be displayed on the recipient mobile device. Example custom wrappers shown on screen 2400 include a card and a birthday cake, although the various embodiments of the present invention are not so limited. Some embodiments allow the user to populate the list of custom wrappers. For example, a user may send a user-generated picture as a custom wrapper. Screen 2400 also allows a user to specify custom text. The custom wrapper and custom text are transmitted as metadata along with the RDC compatible check image.

Figure 25:
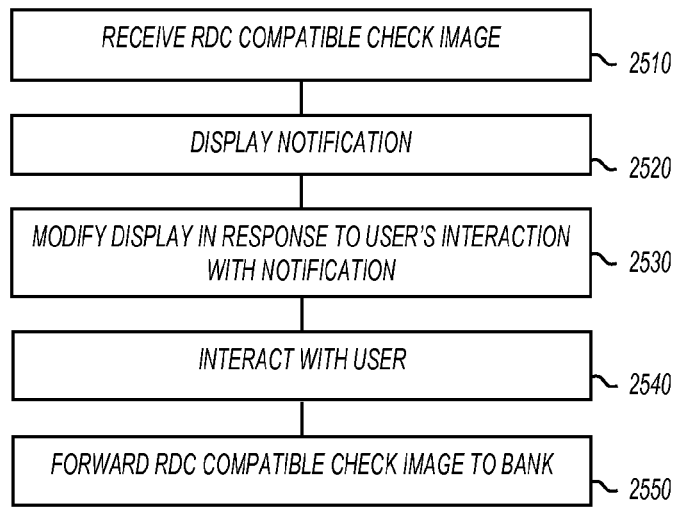
FIGS. 25 and 26 show flowcharts of methods in accordance with various embodiments of the present invention.

FIG. 25 shows a flowchart of methods in accordance with various embodiments of the present invention. In some embodiments, method 2500 may be performed by a mobile device such as mobile device 102 or mobile device 120. Further, in some embodiments, method 2500 may be performed by a processor that is executing software such as RDC application 1420 and/or mobile banking application 1410. Method 2500 is not limited by the type of system or entity that performs the method. The various actions in method 2500 may be performed in the order presented, in a different order, or simultaneously. Further, in some embodiments, some actions listed in FIG. 25 are omitted from method 2500.

Figure 27:
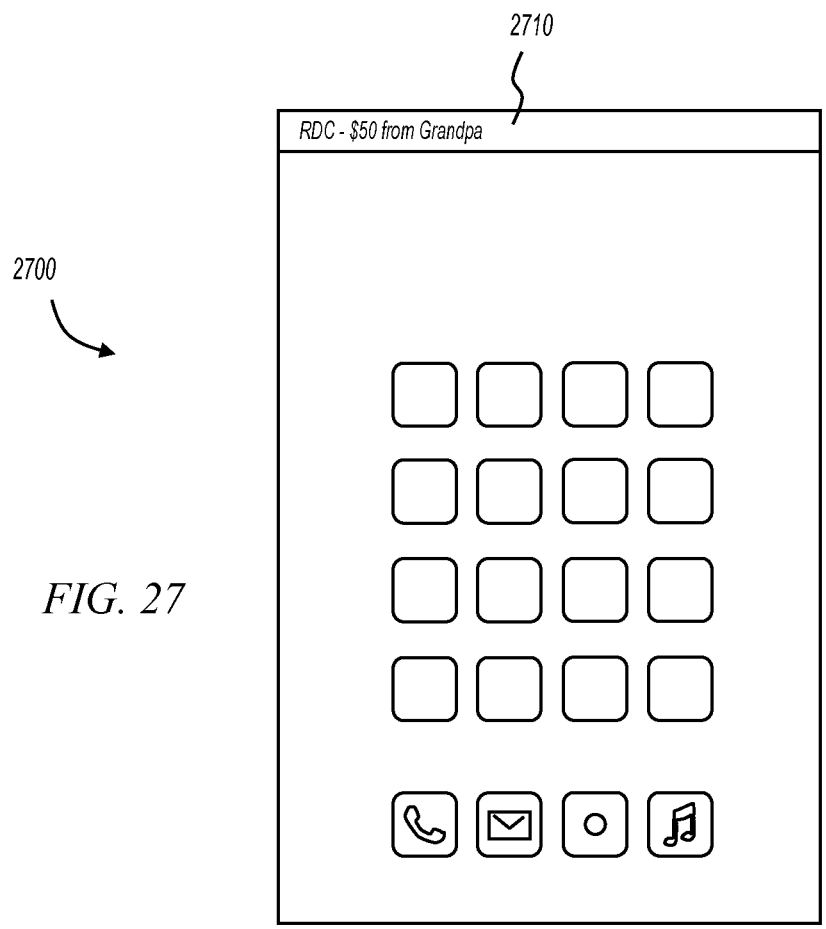
FIGS. 27-29 show mobile device screen shots of a remote deposit application in accordance with various embodiments of the present invention.

In some embodiments, method 2500 is performed by RDC application 1420 when the application receives an RDC compatible check image at 2510. In some embodiments, the RDC compatible check image is received from a server, and in other embodiments, the RDC compatible check image is loaded from memory within the mobile device. In some embodiments, the RDC compatible check image includes metadata either embedded in the image or in accompaniment. At 2520, a notification is displayed to alert the user that the RDC compatible check image has been received. An example notification is shown in FIG. 27, described further below.

Figure 29:
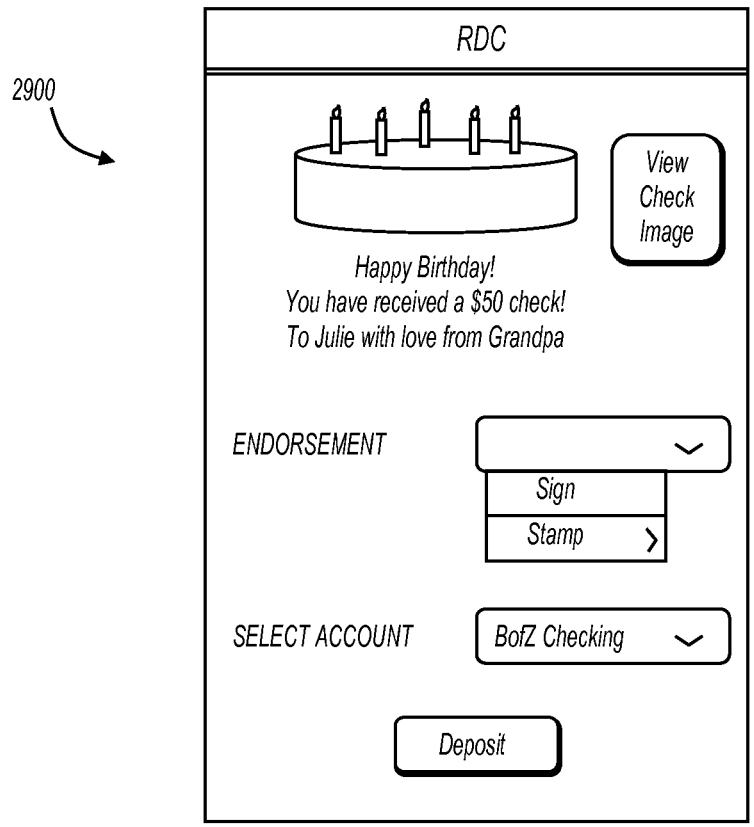

Method 2500 responds to user interaction with the notification at 2530. In some embodiments, method 2500 interacts by displaying an image of the RDC compatible check image. In other embodiments, method 2500 interacts by displaying indicia other than the RDC compatible check image. The indicia may include information specified by, or included within metadata received with the RDC compatible check image. An example of indicia other than the RDC compatible check image is shown in FIG. 29, described further below.

At 2540, method 2500 interacts with the user. In some embodiments, interaction with the user includes prompting for endorsement, prompting the user to specify which bank the RDC compatible check image should be forwarded to, and the like. At 2550, the RDC compatible check image is forwarded to the bank for deposit.

Figure 26:
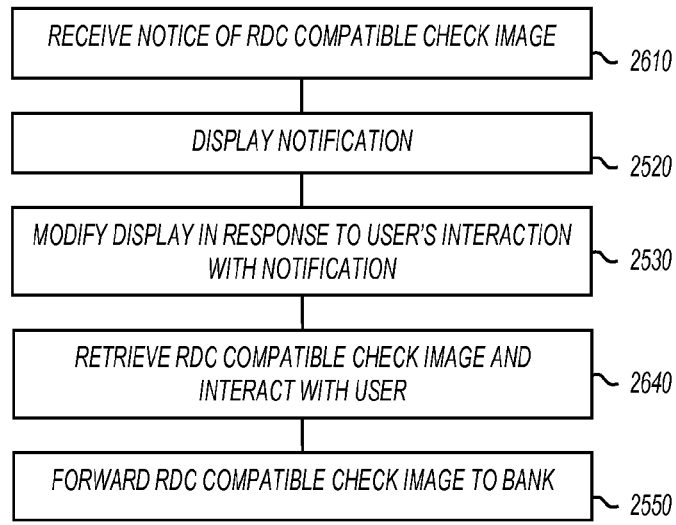

FIG. 26 shows a flowchart of methods in accordance with various embodiments of the present invention. In some embodiments, method 2600 may be performed by a mobile device such as mobile device 102 or mobile device 120. Further, in some embodiments, method 2600 may be performed by a processor that is executing software such as RDC application 1420 and/or mobile banking application 1410. Method 2600 is not limited by the type of system or entity that performs the method. The various actions in method 2600 may be performed in the order presented, in a different order, or simultaneously. Further, in some embodiments, some actions listed in FIG. 26 are omitted from method 2600.

In some embodiments, method 2600 is performed by RDC application 1420 when the application receives notice that a server has an RDC compatible check image at 2610. In some embodiments, the RDC compatible check image is securely stored on a check control server such as check control server 1900. The RDC compatible check image may be encrypted, and/or user authentication to the check control server may be required in order to retrieve the check image. In some embodiments, the RDC compatible check image includes metadata either embedded in the image or in accompaniment. At 2520, a notification is displayed to alert the user that an RDC compatible check image may be retrieved from a check control server. An example notification is shown in FIG. 27, described further below.

Method 2600 responds to user interaction with the notification at 2630. In some embodiments, method 2600 interacts by prompting the user for authentication credentials. In other embodiments, method 2600 interacts by prompting the user for a decryption key or a code from which a decryption key may be determined.

At 2640, the RDC compatible check image is retrieved form the check control server, and method 2600 further interacts with the user. In some embodiments, method 2600 interacts by displaying an image of the RDC compatible check image. In other embodiments, method 2600 interacts by displaying indicia other than the RDC compatible check image. The indicia may include information specified by, or included within, metadata received with the RDC compatible check image. An example of indicia other than the RDC compatible check image is shown in FIG. 29, described further below. In some embodiments, interaction with the user also includes prompting for endorsement, prompting the user to specify which bank the RDC compatible check image should be forwarded to, and the like. At 2550, the RDC compatible check image is forwarded to the bank for deposit.

FIG. 27 shows a mobile device screen shot that includes a notification in accordance with various embodiments of the present invention. Screen 2700 may be any screen on a recipient mobile device 120. For example, screen 2700 may be a desktop screen or an application screen. Screen 2700 includes a notification 2710. In some embodiments, notification 2710 appears on a recipient mobile device when check control server 1900 notifies the RDC application that a check is waiting. The notification shown in FIG. 27 corresponds to the RDC compatible check image prepared as shown in FIG. 24.

Figure 28:
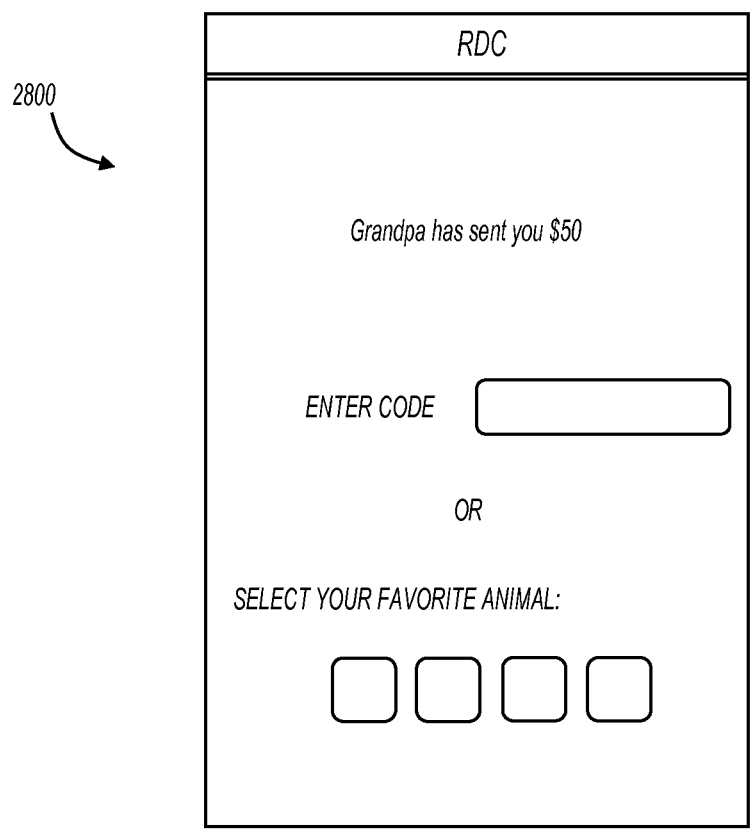

FIG. 28 shows a mobile device screen shot of a remote deposit application in accordance with various embodiments of the present invention. Screen 2800 may be displayed in response to user interaction with notification 2710 (FIG. 27). For example, a user may touch or swipe the notification area of the screen shown in FIG. 27, and screen 2800 may be displayed as a result.

Screen 2800 exists when the system enforces an authentication policy. For example, a user of recipient mobile device 120 may have to enter a code or a password to authenticate to check control server 1900 prior to gaining access to an RDC compatible check image. Also for example, a user of recipient mobile device 120 may have to select an image to authenticate to check control server 1900 prior to gaining access to an RDC compatible check image.

FIG. 29 shows a mobile device screen shot of a remote deposit application in accordance with various embodiments of the present invention. Screen 2900 may be displayed in response to user interaction with notification 2710 (FIG. 27), or in response to authenticating as described above with reference to FIG. 28. The birthday cake and related text correspond to metadata retrieved along with the RDC compatible check image. In some embodiments, a button is provided to toggle between the alternate image (birthday cake in this example) and the RDC compatible check image. In other embodiments, toggling is not possible, and the RDC compatible check image is not displayed. As shown in FIG. 29, endorsement and bank account selection may be provided to the user.

FIG. 30 shows a mobile device screen shot of a check image generator application in accordance with various embodiments of the present invention. Screen 3000 shows history of previously sent RDC compatible check images. In some embodiments, this screen is shown when a user selects menu option 450 (FIG. 4).

Various embodiments of the present invention provide encryption and/or authentication. In some embodiments, credentials for encryption and/or authentication are stored in a secure element such as secure element 368 (FIGS. 3, 14). For example, a user may be authenticated to a check control server, or may be able to encrypt or decrypt an RDC compatible check image when a secure element is either included within the mobile device or a secure element is on communication with the mobile device. Example secure element form factors that communicate with the mobile device include a microSD card, USB dongle, Bluetooth device, NFC device, and the like.

Figure 31:
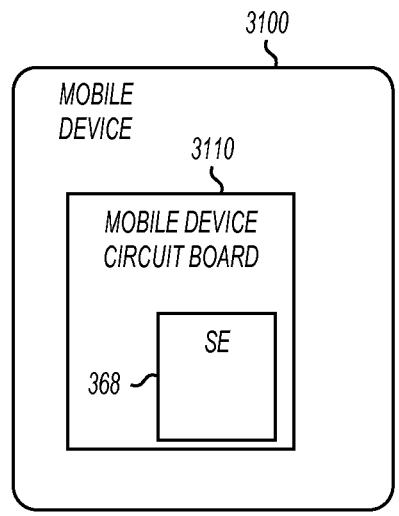
FIG. 31 shows a mobile device with a secure element on a circuit board in accordance with various embodiments of the present invention.

FIG. 31 shows a mobile device with a secure element on a circuit board in accordance with various embodiments of the present invention. Mobile device 3100 includes circuit board 3110, which in turn includes secure element (SE) 368. In some embodiments, SE 368 is packaged with an NFC radio in a single integrated circuit such as a dual interface smartcard controller, and in other embodiments, they are packaged separately. Circuit board 3110 may include a processor, memory, or circuits that support other services. In some embodiments, circuit board 3110 is a board that is fixed within mobile device 3100 and that includes many components other than those shown.

In some embodiments, SE 368 resides in an add-on slot on the circuit board, and may be removable or nonremovable. For example, in some embodiments, an add-on slot may be provided on circuit board 3110 to accept SE 368. In some of these embodiments, SE 368 may be user accessible and removable, and in other embodiments, SE 368 may be nonremovable even though it resides in an add-on slot.

Figure 32:
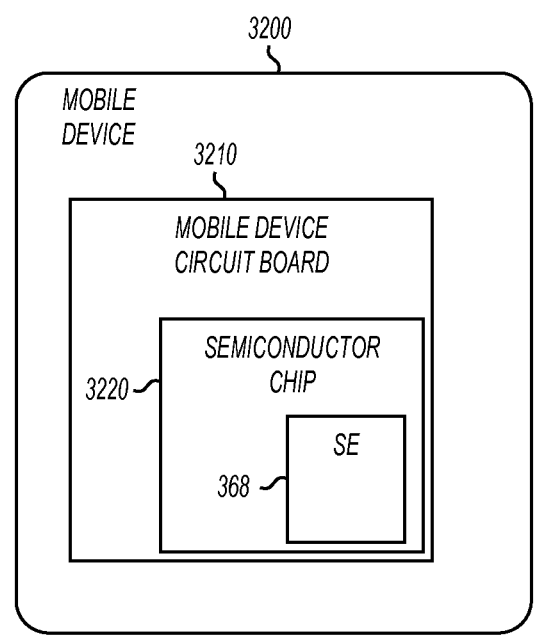
FIG. 32 shows a mobile device with a secure element in a semiconductor chip in accordance with various embodiments of the present invention.

FIG. 32 shows a mobile device with a secure element in a semiconductor chip in accordance with various embodiments of the present invention. Mobile device 3200 includes circuit board 3210, which in turn includes semiconductor chip 3230. Semiconductor chip 3230 also includes SE 368. In some embodiments, the semiconductor chip includes other functionality such as a microprocessor. In these embodiments, SE 368 is embedded within the semiconductor chip 3220. Circuit board 3210 includes circuits that provide one or more services. For example, circuit board 3210 may include a memory, a display controller, a cellular radio, or the like. In some embodiments, circuit board 3210 is a board that is fixed within mobile device 3200 and that includes many components other than those shown.

In some embodiments, SE 368 resides in an add-on slot in the semiconductor chip, and the semiconductor chip resides in an add-on slot on the circuit board, and both may be removable or nonremovable.

Figure 33:
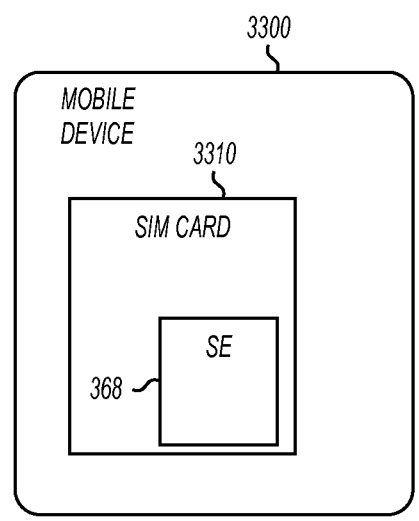
FIG. 33 shows a mobile device with a secure element on a subscriber identity module (SIM) card in accordance with various embodiments of the present invention.

FIG. 33 shows a mobile device with a secure element on a subscriber identity module (SIM) card in accordance with various embodiments of the present invention. Mobile device 3300 includes subscriber identity module (SIM) 3310, which in turn includes secure element (SE) 368. SIM 3310 includes circuits that provide one or more services. For example, SIM 3310 may include other circuits that identify a user of mobile device 3300 to a mobile network operator. In some embodiments, SIM card 3310 is a removable card that is inserted into an add-on slot within mobile device 3300 and that includes many components other than those shown. In some embodiments, SIM card 3310 may be added to a non-removable add-on slot.

Figure 34:
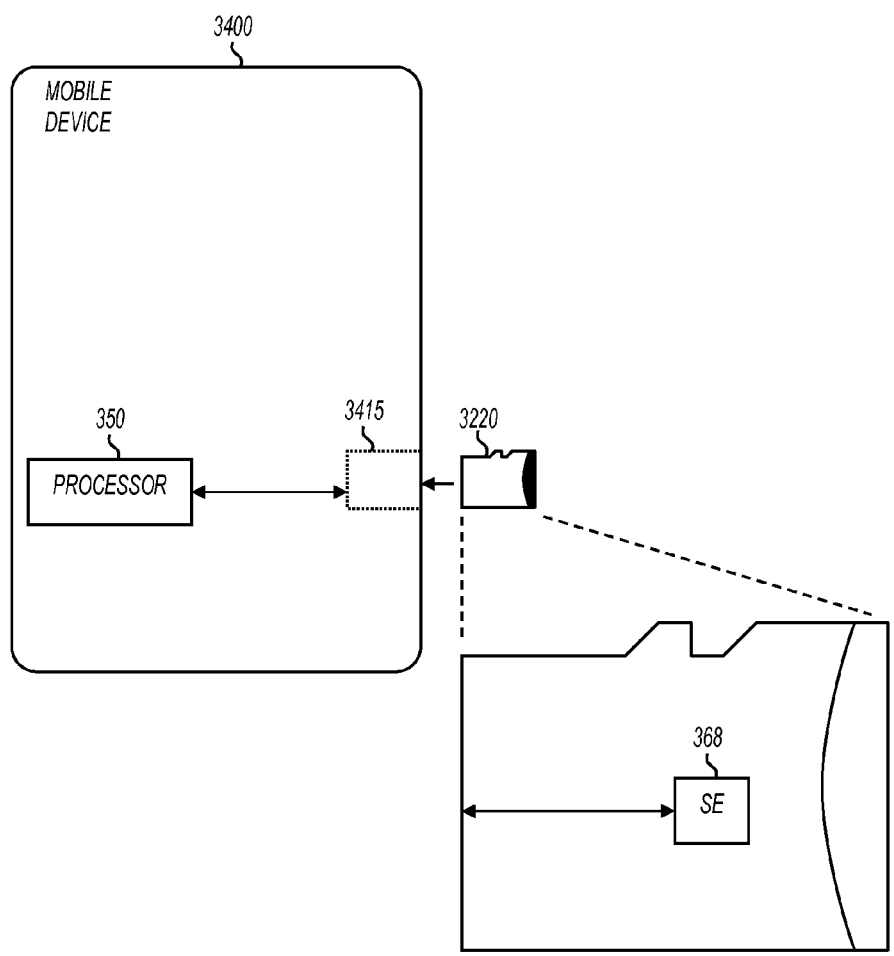
FIG. 34 shows a mobile device with a secure element on a memory card in accordance with various embodiments of the present invention.

FIG. 34 shows a mobile device with a memory card that includes a secure element in accordance with various embodiments of the present invention. Mobile device 3400 includes add-on slot 3415. Add-on slot 3415 accepts memory card 3420, which is shown as a microSD memory card; however this is not a limitation of the present invention. In some embodiments, microSD memory card 3420 may be added to a non-removable add-on slot. For example, system memory for mobile device 3400 may be provided by memory card 3420, and memory card 3420 may be placed in an add-on slot in such a manner that it is nonremovable. Memory card 3420 includes secure element 368. The combination of mobile device 3400 and memory card 3420 is an example of an electronic system that includes a mobile device and an add-on card that includes a secure element.

Figure 35:
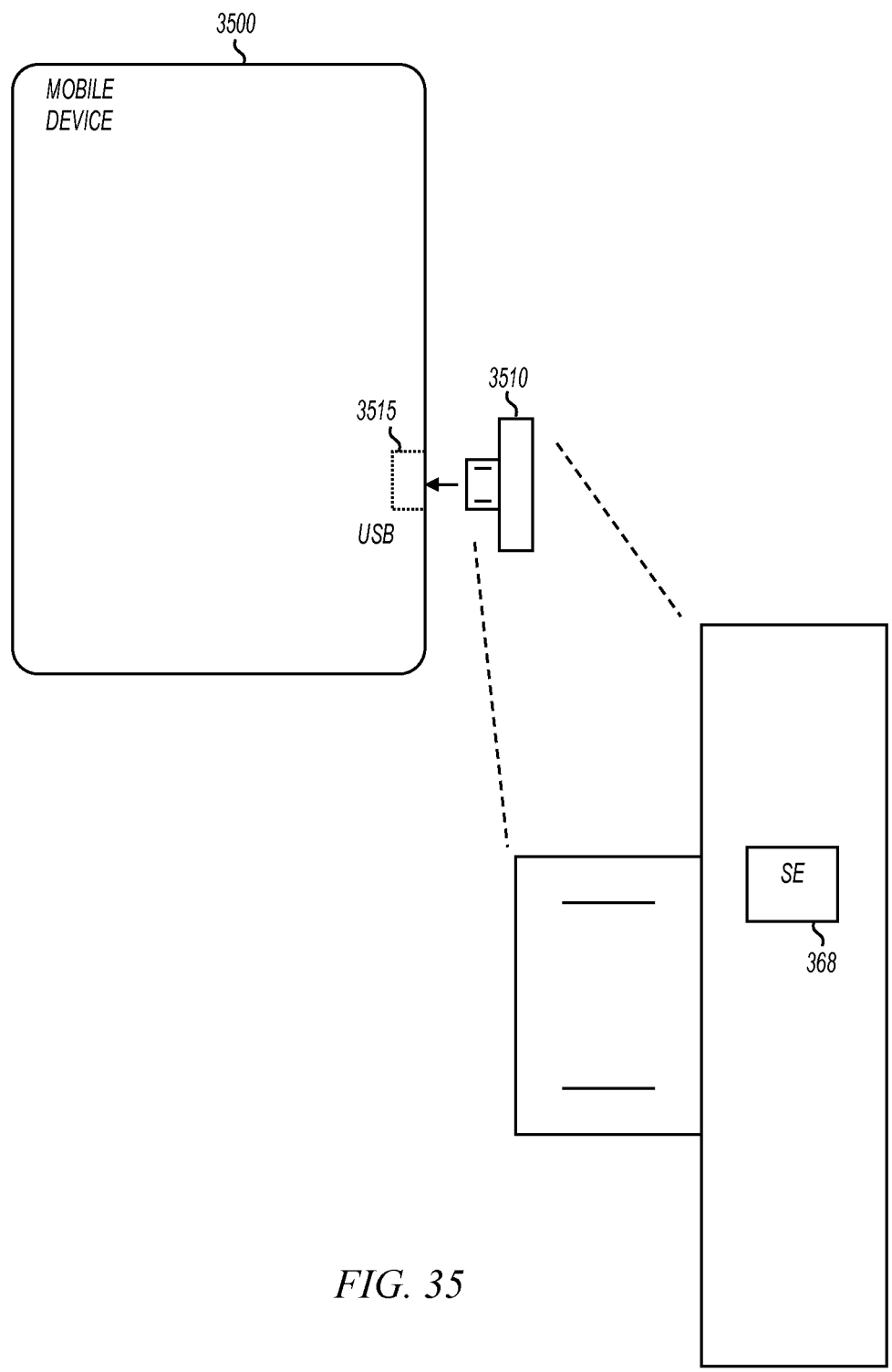
FIG. 35 shows a mobile devices with a universal serial bus (USB) device that includes a secure element in accordance with various embodiments of the present invention.

FIG. 35 shows a mobile device with a universal serial bus (USB) device that includes a secure element in accordance with various embodiments of the present invention. Mobile device 3500 includes add-on slot 3515. Add-on slot 3515 is shown as a universal serial bus (USB) port which accepts USB dongle 3510; however this is not a limitation of the present invention. Add-on slot 3515 may be other than a USB port, and device or dongle 3510 may be other than a USB dongle. USB dongle 3510 includes secure element 368. The combination of mobile device 3500 and USB dongle 3510 is an example of an electronic system that includes a mobile device and an add-on card that includes a secure element.

Figure 36:
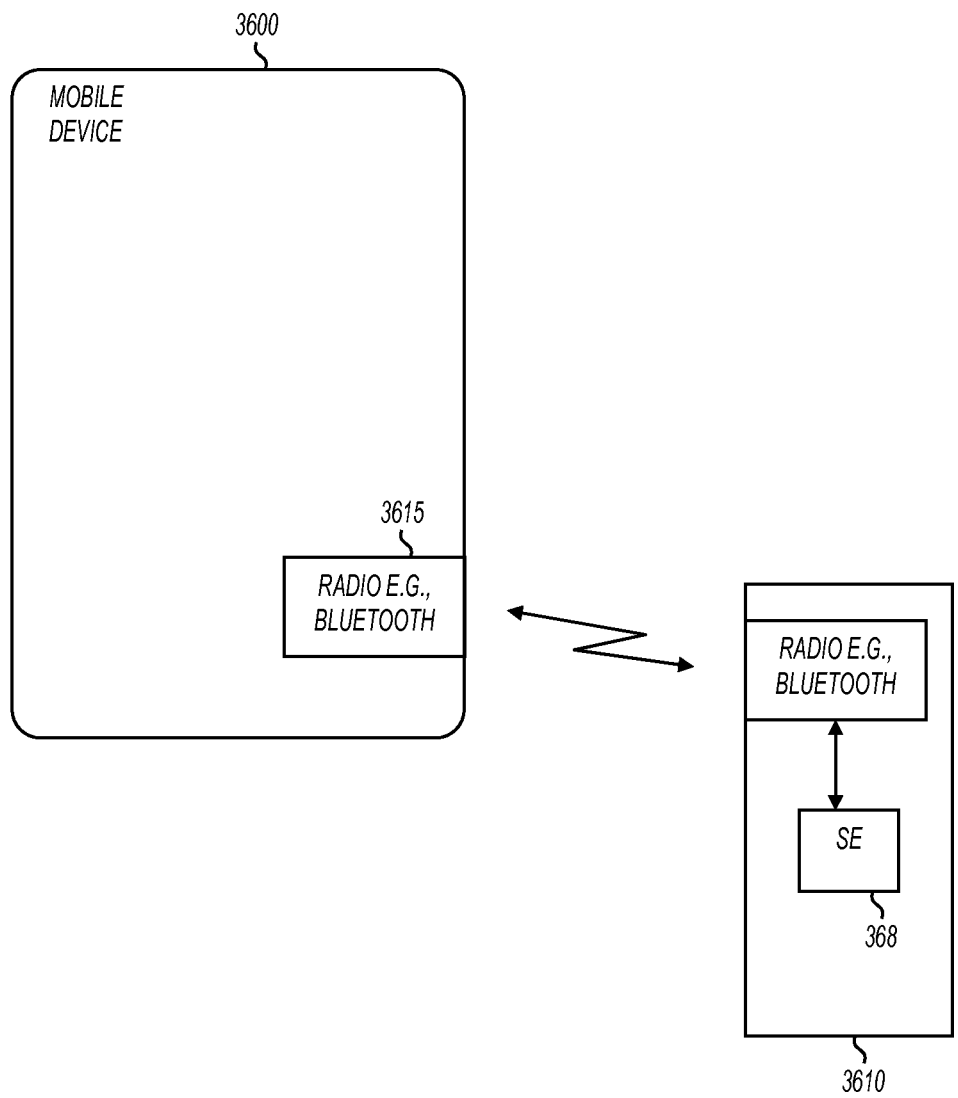
FIG. 36 shows a mobile device with a secure element on a token that communicates wirelessly with the mobile device in accordance with various embodiments of the present invention.

FIG. 36 shows a mobile device with a secure element on a token that communicates wirelessly with the mobile device in accordance with various embodiments of the present invention. Mobile device 3600 includes radio 3615. Radio 3615 may be any type of radio capable of communicating with token 3610. Examples include, but are not limited to, a Bluetooth radio, a WiFi radio, an NFC radio, or the like. Token 3610 includes secure element 368 and a radio compatible with radio 3615. The combination of mobile device 3600 and token 3610 is an example of an electronic system that includes a mobile device and a token that includes a secure element.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A remote deposit system comprising:
   a server to store remote deposit capture (RDC) compatible check images;
   a first application program to be executed by a first mobile device separate from the server, wherein the first application program includes instructions for:
   prompting a payor for check information;
   combining the information provided by the payor with a nonscanned check image to create a remote deposit capture (RDC) compatible check image; and
   transmitting the RDC compatible check image to the server; and
   a second application program to be executed by a second mobile device separate from the server, wherein the second application program includes instructions for:
   prompting a payee to either take a picture of a check for remote deposit or to receive the RDC compatible check image from the server;
   in response to the payee selecting to receive the RDC compatible check image, authenticating the payee to the server using a smartcard secure element in communication with the second mobile device and receiving the RDC compatible check image from the server only after authenticating; and
   forwarding the RDC compatible check image to a financial institution for deposit.

2. The remote deposit system of claim 1 wherein the first application program further includes instructions for encrypting the RDC compatible check image prior to transmitting.

3. The remote deposit system of claim 1 wherein the first application program further includes instructions for prompting the payor for check image metadata.

4. The remote deposit system of claim 3 wherein the first application program further includes instructions for transmitting the check image metadata to the server.

5. The remote deposit system of claim 3 wherein the check image metadata represents personalized greeting information.

6. The remote deposit system of claim 5 wherein the personalized greeting information represents a graphic to be displayed to the payee.

7. A remote deposit system comprising:
   a server to store remote deposit capture (RDC) compatible check images; and
   a first mobile device having a memory with a first stored application program, wherein the first stored application program includes instructions that when executed by the first mobile device result in the first mobile device:
   prompting a payor for check information;
   creating an RDC compatible check image by combining a pre-prepared check image with data provided by the payor; and
   transmitting the RDC compatible check image to the server for later remote deposit; and
   a second mobile device having a memory with a second stored application program, wherein the second stored application program includes instructions that when executed by the second mobile device result in the second mobile device:
   prompting a payee to either take a picture of a check for remote deposit or to receive the RDC compatible check image from the server;
   in response to the payee selecting to receive the RDC compatible check image, authenticating the payee to the server using a smartcard secure element in communication with the second mobile device and receiving the RDC compatible check image from the server only after authenticating; and
   forwarding the RDC compatible check image to a financial institution for deposit.

8. The remote deposit system of claim 7 wherein the check information provided by the payor includes a bank routing number and a bank account number.

9. The remote deposit system of claim 7 wherein check information provided by the payor does not include a bank routing number and a bank account number.

10. The remote deposit system of claim 7 wherein the check information provided by the payor is character recognized from a scanned image.

11. The remote deposit system of claim 7 wherein the check information provided by the payor includes payee information.

12. The remote deposit system of claim 7 wherein the check information provided by the payor is entered using keystrokes.

13. The remote deposit system of claim 7 wherein the first application program further includes instructions for encrypting the RDC compatible check image prior to transmitting.

14. The remote deposit system of claim 7 wherein prompting a payor for check information comprises allowing the payor to select a contact stored on the mobile device.

15. A remote deposit system comprising:
   a server to store remote deposit capture (RDC) compatible check images; and
   a first mobile device having a non-transitory computer readable storage medium storing one or more programs comprising instructions, which when executed by the first mobile device, cause the first mobile device to perform:
   capturing a photograph of a blank check;
   performing character recognition to extract static check data from the photograph of the blank check;
   prompting a payor for dynamic check information to fill out a check;
   combining the static check data and dynamic check data to create a remote deposit capture (RDC) compatible check image; and
   transmitting the RDC compatible check image to the server; and
   a second mobile device having a non-transitory computer readable storage medium storing one or more programs comprising instructions, which when executed by the second mobile device, cause the second mobile device to perform:
   prompting a payee to either take a picture of a check for remote deposit or to receive the RDC compatible check image from the server; and in response to the payee selecting to receive the RDC compatible check image, authenticating the payee to the server using a smartcard secure element in communication with the second mobile device and receiving the RDC compatible check image from the server only after authenticating; and forwarding the RDC compatible check image to a financial institution for deposit.

16. The remote deposit system of claim 15 further comprising instructions that when executed cause the first mobile device to encrypt the RDC compatible check image prior to transmitting.

17. The remote deposit system of claim 15 wherein a decryption key is stored on the server to be provided to a payee.

18. The remote deposit system of claim 15 wherein the static check data comprises a bank routing number.

19. The remote deposit system of claim 15 wherein the dynamic check information includes payee information.

20. The remote deposit system of claim 15 further comprising instructions that when executed cause the first mobile device to transmit metadata representing personalized greeting information specified by the payor.

* * * * *